US010338869B2

(12) United States Patent
Onoda

(10) Patent No.: US 10,338,869 B2
(45) Date of Patent: Jul. 2, 2019

(54) NON-TRANSITORY COMPUTER READABLE RECORDING MEDIUM, INFORMATION PROCESSING DEVICE AND SETTING CHANGE NOTIFICATION METHOD FOR NOTIFYING A USER OF A SETTING CHANGE

(71) Applicant: Konica Minolta, Inc., Chiyoda-ku, Tokyo (JP)

(72) Inventor: Yuko Onoda, Itami (JP)

(73) Assignee: Konica Minolta, Inc., Chiyoda-ku, Tokyo (JP)

( * ) Notice: Subject to any disclaimer, the term of this patent is extended or adjusted under 35 U.S.C. 154(b) by 93 days.

(21) Appl. No.: 14/638,283

(22) Filed: Mar. 4, 2015

(65) Prior Publication Data

US 2015/0256705 A1    Sep. 10, 2015

(30) Foreign Application Priority Data

Mar. 6, 2014 (JP) ................................. 2014-043555

(51) Int. Cl.
- *G06F 3/12* (2006.01)
- *H04N 1/00* (2006.01)
- *H04L 12/58* (2006.01)

(52) U.S. Cl.
CPC .......... *G06F 3/1258* (2013.01); *G06F 3/1205* (2013.01); *H04L 51/18* (2013.01); *H04N 1/00212* (2013.01)

(58) Field of Classification Search
CPC .......................... H04N 1/00212; G06F 3/1258
See application file for complete search history.

(56) References Cited

U.S. PATENT DOCUMENTS 8,976,404 B2 * 3/2015 Kobayashi ............... B41J 29/38
                                                       358/1.16
2001/0027469 A1   10/2001 Torikai
(Continued)

FOREIGN PATENT DOCUMENTS

JP    11-134127 A    5/1999
JP    2002-229640 A  8/2002
(Continued)

OTHER PUBLICATIONS

Office Action dated Jan. 12, 2016, by the Japanese Patent Office in corresponding Japanese Patent Application No. 2014-043555, and an English translation of the Office Action. (6 pages).

*Primary Examiner* — Nicholas Pachol
(74) *Attorney, Agent, or Firm* — Buchanan Ingersoll & Rooney PC

(57) ABSTRACT

A non-transitory computer readable recording medium on which a device driver is recorded, the device driver is booted on an information processing device connected to an output device and outputs an output job by generating the output job. The device driver causes the information processing device to serve as: a specific character string information registering part configured to register in advance information of a specific character string included in an email relating to a setting change of the output device; a detecting part configured to detect the email which includes the specific character string from among the emails which have been received in the past as the device driver is booting; and a notifying part configured to notify a user of information relating to the setting change of the output device based on the email which includes the specific character string when the email is detected by the detecting part.

30 Claims, 14 Drawing Sheets

(56) References Cited

U.S. PATENT DOCUMENTS

| | | | |
|---|---|---|---|
| 2002/0056015 A1 | 5/2002 | Nakai et al. | |
| 2002/0097414 A1* | 7/2002 | Utsunomiya | G06K 15/00 |
| | | | 358/1.13 |
| 2003/0033451 A1 | 2/2003 | Yoshida et al. | |
| 2003/0231338 A1* | 12/2003 | Haga | H04L 12/58 |
| | | | 358/1.15 |
| 2006/0044586 A1* | 3/2006 | Kujirai | G06F 3/1204 |
| | | | 358/1.13 |
| 2008/0151330 A1* | 6/2008 | Takahata | H04N 1/00352 |
| | | | 358/497 |
| 2009/0006833 A1* | 1/2009 | Yamada | G03G 15/50 |
| | | | 713/2 |
| 2009/0161158 A1* | 6/2009 | Fujikawa | H04L 12/5835 |
| | | | 358/1.15 |
| 2013/0070296 A1* | 3/2013 | Ishibashi | G06F 3/1207 |
| | | | 358/1.15 |
| 2015/0146234 A1* | 5/2015 | Konuma | G06K 15/402 |
| | | | 358/1.14 |
| 2015/0153969 A1* | 6/2015 | Okayama | G06F 3/1204 |
| | | | 358/1.15 |

FOREIGN PATENT DOCUMENTS

| | | |
|---|---|---|
| JP | 2002-236576 A | 8/2002 |
| JP | 2003-067151 A | 3/2003 |
| JP | 2003-330642 A | 11/2003 |
| JP | 2006-139384 A | 6/2006 |
| JP | 2006-331436 A | 12/2006 |
| JP | 2012-086448 A | 5/2012 |

\* cited by examiner

IMAGE FORMING SYSTEM 1

FIG. 3

EMAIL INFORMATION MANAGEMENT TABLE 50

| TRANSMISSION DATE AND TIME | TITLE | SENDER | MESSAGE ID | OPEN FLAG | OPEN DATE AND TIME |
|---|---|---|---|---|---|
| 2014/1/1 11:00 | [C364 SETTING CHANGE] △△△ | admin@... | ×××××@... | ON | 2014/1/1 11:05 |
| 2014/1/3 18:30 | [groupA SETTING CHANGE] ××× | admin@... | ×△O××@... | OFF | |
| 2014/1/10 21:03 | [C364 SETTING CHANGE] OOO | admin@... | △O×××@... | OFF | |
| 2014/1/10 22:00 | REGARDING □□□ | abc@... | OOO△△@... | OFF | |
| . | . | . | . | . | . |

PRINT SETTING NOTIFYING SYSTEM 1

NON-TRANSITORY COMPUTER READABLE RECORDING MEDIUM, INFORMATION PROCESSING DEVICE AND SETTING CHANGE NOTIFICATION METHOD FOR NOTIFYING A USER OF A SETTING CHANGE

This application is based on the application No. 2014-043555 filed in Japan, the contents of which are hereby incorporated by reference.

BACKGROUND OF THE INVENTION

Field of the Invention

The present invention relates to a non-transitory computer readable recording medium, an information processing device and a setting change notification method.

Description of the Background Art

Information processing device such as a personal computer boots a device driver installed in advance, thereby outputting a print job to an image forming device connected to a network. A variety of information including user information relating to a user including a user ID and a user password and group information relating to a group to which the user is belonged such as a group ID and a group password is registered in advance with the device driver. For outputting the print job to the image forming device, the device driver extracts information designated in advance in the registered information, and outputs the print job with attaching the extracted information. In response to receiving the print job, the image forming device performs an authentication process or a billing process based on the information attached to the print job, and executes the print job.

On an image forming system as described above, an administrator may make a change on operation procedures relating to the authentication process and the billing process at the image forming device. If the change is made on the procedures, the information to be attached to the print job may change. The authentication process or the billing process performed for each group may be changed, and the process is performed for each user after the change, for example. In such a case, the information to be attached to the print job is changed to the user information from the group information. Thus, when the administrator changes the operational procedure at the image forming device, he or she is required to change the setting on the device driver of the information processing device used by each user. However, there may be a lot of users, or the administrator and the user may be working at the separated places. In such a case, if the administrator configures the setting change on the device driver of the information processing device used by each user individually, the working load on the administrator becomes extremely heavy. Also, the setting change on the device driver may not be applied rapidly.

There are various types of techniques of managing or maintaining an output device such as one of MFPs or a printer with emails. These known techniques are introduced for example in Japanese Patent Application Laid-Open No. 2006-331436, Japanese Patent Application Laid-Open No. 2002-236576, Japanese Patent Application Laid-Open No. 2002-229640 and Japanese Patent Application Laid-Open No. 2003-330642. According to these techniques, the working load on the administrator as described above may be lightened by using emails. To be more specific, the administrator changes the operational procedure at the image forming device. In response to making the change, the administrator sends an email which asks the user to change the setting on the device driver to each user. As a result, the user is allowed to change the setting on the device driver on his or her own, and the working load on the administrator may be lightened. Also, the setting change on the device driver may be applied rapidly.

Sending the email asking the user to change the setting on the device driver to each user by the administrator may not be enough to have an appropriate change of the setting on the device driver of the information processing device used by each user. When the user does not open the email from the administrator, for instance, the setting on the device driver is not changed. The user may boot the device driver and output the print job without making any change on the setting of the device driver. In such a case, the process such as the authentication process and the billing process are not performed appropriately at the image forming device. The print job is then discarded. More specifically, when the setting change on the device driver is not appropriately applied, the print job is not appropriately executed at the image forming device.

When the print job is not appropriately executed at the image forming device even though he or she sent the job, he or she notices that he or she has not made the appropriate change on the setting of the device driver. The user then starts looking for the email sent by the administrator from a group of emails received in the past. It requires a long time for the user to find one email sent by the administrator from the group of emails including many emails. Thus, the setting of the device driver may not be changed efficiently.

SUMMARY OF THE INVENTION

The present invention has been made in order to solve the above-described problems. The present invention is intended to provide a non-transitory computer readable recording medium, an information processing device and a setting change notification method that are capable of allowing each user to make an appropriate change on a setting of the device driver when a setting of an output device such as an image forming device is changed.

First, the present invention is directed to a non-transitory computer readable recording medium on which a device driver is recorded, the device driver is booted on an information processing device connected to an output device and outputs an output job by generating the output job.

According to one aspect of the non-transitory computer readable recording medium, the device driver causes the information processing device to serve as: a specific character string information registering part configured to register in advance information of a specific character string included in an email relating to a setting change of the output device; a detecting part configured to detect the email which includes the specific character string from among the emails which have been received in the past as the device driver is booting; and a notifying part configured to notify a user of information relating to the setting change of the output device based on the email which includes the specific character string when the email is detected by the detecting part.

Second, the present invention is directed to an information processing device connected to an output device.

According to one aspect of the information processing device, the information processing device comprises: a specific character string information registering part configured to register in advance information of a specific character string included in an email relating to a setting change of the output device; a detecting part configured to detect the email which includes the specific character string from among the emails which have been received in the past; and a notifying part configured to notify a user of information relating to the setting change of the output device based on the email which includes the specific character string when the email is detected by the detecting part.

Third, the present invention is directed to a setting change notification method applied at an information processing device which is connected to an output device.

According to one aspect of the setting change notification method, the setting change notification method comprises the steps of: (a) registering in advance information of a specific character string included in an email relating to a setting change of the output device; (b) detecting the email which includes the specific character string from among the emails which have been received in the past; and (c) notifying a user of information relating to the setting change of the output device based on the email which includes the specific character string when the email is detected in the step (b).

BRIEF DESCRIPTION OF THE DRAWINGS

FIG. 3 shows an example of an email management table;

DESCRIPTION OF THE PREFERRED EMBODIMENTS

Figure 1:
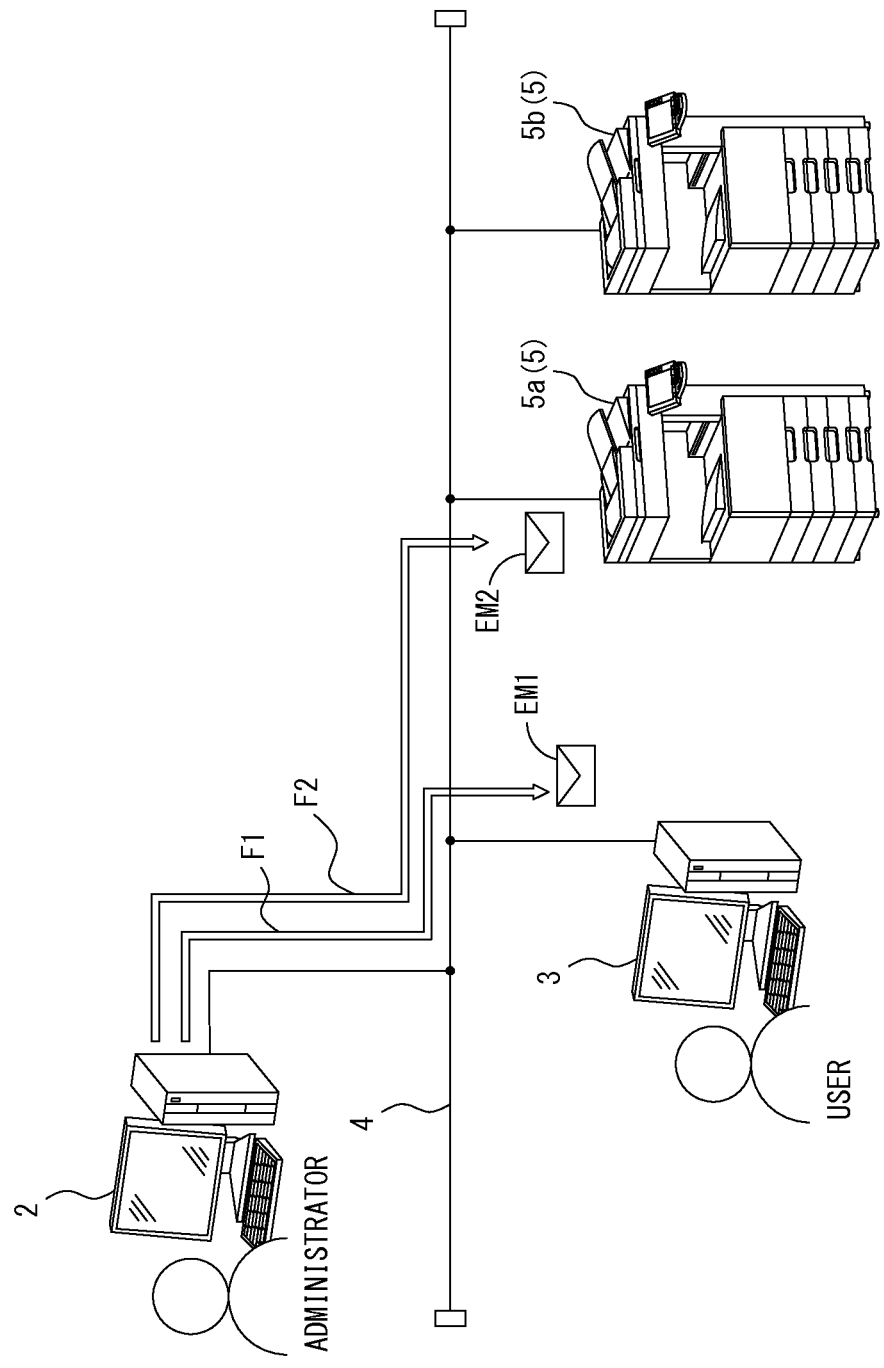
FIG. 1 shows an exemplary configuration of a print setting change notification system.

Preferred embodiments of the present invention are described in detail below with reference to figures. In the description given below, those elements which are shared in common in the preferred embodiments are represented by the same reference numerals, and are not discussed repeatedly for the same description.

First Preferred Embodiment

FIG. 1 shows an exemplary configuration of an image forming system 1 comprising an information processing device 3 including with a print setting change notification function. The image forming system 1 is a network system which includes multiple information processing devices 2 and 3 and an image forming device 5. The image forming system 1 is constructed to produce printed outputs at a place such as an office, for example. On the image forming system 1, each of the multiple information processing devices 2 and 3 and the image forming device 5 is connected to a network 4 such as a LAN (Local Area Network).

The information processing device 3 is formed from a device such as a general personal computer (PC), for instance, and used by a user who is using the image forming device 5. A device driver (not shown in figures) which is a program corresponding to the image forming device 5 is installed on the information processing device 3. The information processing device 3 boots the device driver and brings a driver 15 into operation, thereby generating a print job executable on the image forming device 5 and sending the print job to the image forming device 5.

The image forming device 5 is placed as an output device connected to the network 4. The image forming device 5 produces printed outputs based on the print job received over the network 4. The image forming device 5 is, for example, formed from a device generally called by names such as MFPs (Multi-Function Peripherals) having several functions such as a print function, a scan function, a copy function, a fax function and an email transmission and receipt function. The image forming device 5, however, is not limited to the MFPs. The image forming device 5 may be a device with a single function such as a printer or a fax machine including with an email receipt function.

The information processing device 2 is formed from a general personal computer (PC), for instance, and is used by an administrator of the image forming device 5. The administrator determines an operational procedure at the image forming device 5 connected to the network 4, and configures a variety of settings relating to an authentication process and a billing process based on the operational procedure at the image forming device 5. In response to receiving the print job over the network 4, the image forming device 5 performs the authentication process and/or the billing process configured in advance by the administrator. The image forming device 5 then starts the process to produce the printed output based on the print job if the authentication process and/or the billing process is performed appropriately.

A setting corresponding to an initial setting on the image forming device 5 configured by the administrator is applied to the device driver of the information processing device 3 used by each user. After the device driver is booted on the information processing device 3 and the driver 15 is brought into operation, the driver 15 generates the print job corresponding to the initial setting on the image forming device 5 and sends the print job to the image forming device 5.

For changing the operational procedure at the image forming device 5, the administrator changes the settings on the image forming device 5. To be more specific, the administrator changes the setting corresponding to the change he or she is willing to make on the variety of settings relating to the authentication process and/or the billing process at the image forming device 5, thereby changing the operational procedure at the image forming device 5. After the change is made, the variety of process details relating to the authentication process and/or the billing process performed at the image forming device 5 are changed.

In this case, the administrator operates the information processing device 2 to send an email EM1 relating to the setting change at the image forming device 5 to the user who is using the image forming device 5 at which the operational procedure is changed. The email EM1 is sent to the user's information processing device 3 from the administrator's information processing device 2 as shown with an arrow F1, for example. Information which notifies the user of information including the detail of the setting change made on the device driver corresponding to the setting change on the image forming device 5 is contained in the email EM1. The detail of the setting change made on the device driver may be the setting change of information to be attached to the print job when the print job is sent to the image forming device 5. The administrator may send an email EM2, the same as the email EM1, to the image forming device 5 which has changed the operational procedure as shown with an arrow F2.

For creating the emails EM1 and EM2, the administrator includes a specific character string which allows to identify that the email including the specific character string is relating to the setting change at the image forming device 5 in titles of the emails EM1 and EM2, for instance. A character string which identifies the certain image forming device 5 such as a device name or a device ID of the image forming device 5 at which the setting is changed by the administrator, for example, may be included as the specific character string. Alternatively, a character string which identifies the certain user or a group such as a user name of the user who is required to make change on the setting of the device driver in response to the setting change at the image forming device 5 by the administrator or a group name of the user, for example, may be included as the specific character string. By referring the specific character string included in the emails EM1 and EM2, each user is allowed to know what change is made on the setting at the image forming device 5 by the administrator, and whether or not the setting change of the device driver is necessary.

The information processing device 3 and the image forming device 5 receive each of the emails EM1 and EM2 from the administrator's information processing device 2 via an email application (hereafter, mailer) which is capable of transmitting and receiving emails. After receiving the emails EM1 and EM2, the information processing device 3 and the image forming device 5 store them in the respective storage devices. The information processing device 3 and the image forming device 5 receive many other emails except for the emails EM1 and EM2, and store in the respective storage devices. To be more specific, many types of the emails are stored in the storage devices.

After the user boots the device driver of the information processing device 3, the driver 15 detects the email EM1 including the specific character string from among the emails received in the past. The driver 15 then notifies the user that the email EM1 relating to the setting change at the image forming device 5 has been received. The user checks the detected email EM1 after receiving the notification, thereby applying appropriately the setting change of the device driver as notified by the administrator. In the first preferred embodiment, the specific character string is included in a title, for example. The present invention does not limit to the specific character string included in the title. The specific character string may be included in a body, for example.

Figure 2:
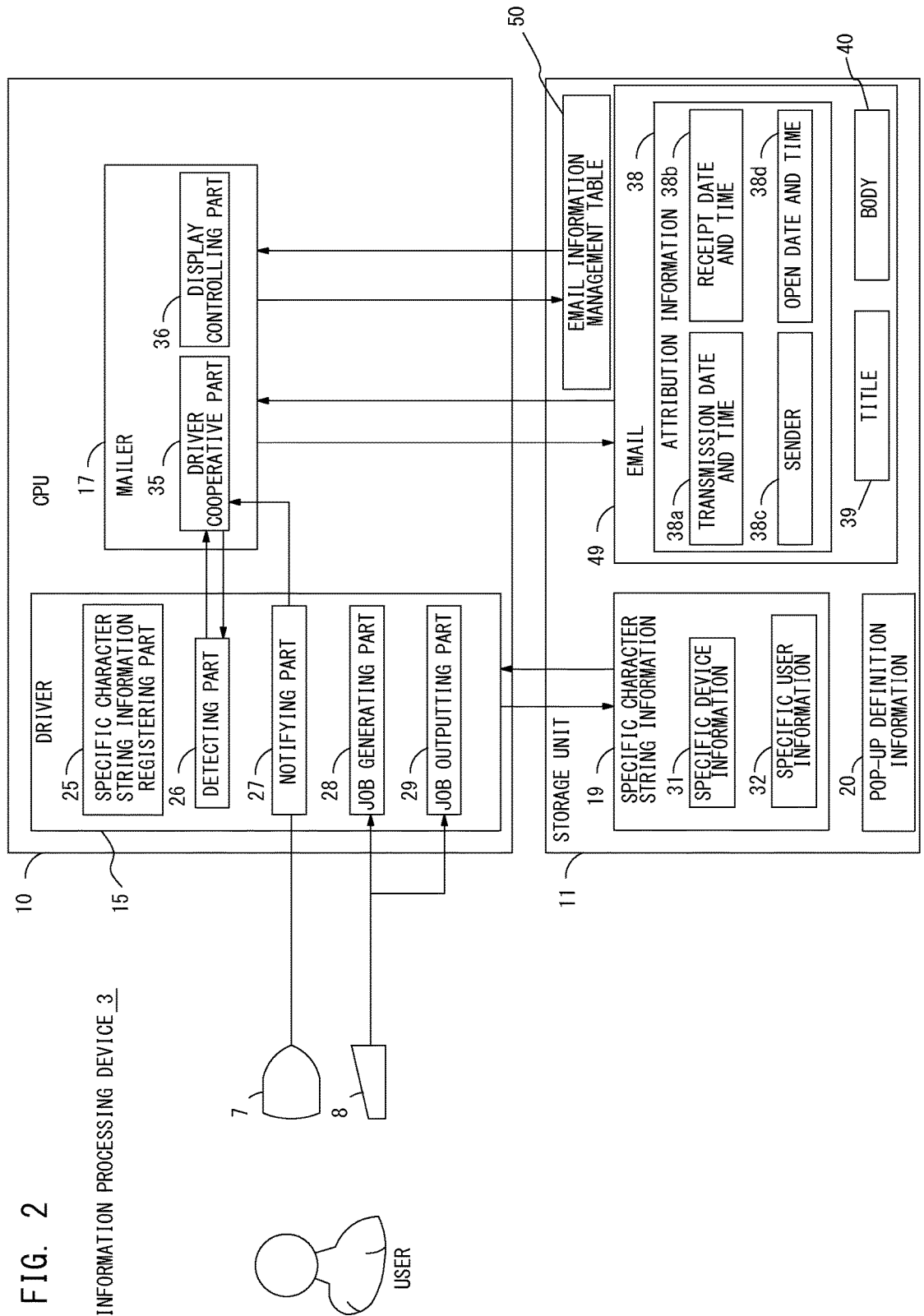
FIG. 2 is a block diagram showing the functional configuration of an information processing device including with a print setting notification function.

FIG. 2 is a block diagram showing the functional configuration of the information processing device 3 when the device driver and the mailer are booted on the information processing device 3. The information processing device 3 includes a CPU 10, a storage unit 11, a display device 7 and a manipulation input device 8. The CPU 10 reads and executes a variety of pre-installed programs in the storage unit 11, which are not shown in FIG. 2. The storage unit 11 is, for example, a volatile storage device formed from a device such as a hard disk device. The display device 7 is formed from a device such as a color liquid crystal display, for example. A variety of information is displayed on the display device 7. The manipulation unit device 8 includes devices such as a keyboard and a mouse to receive a variety of inputs by the user.

The CPU 10 boots the device driver installed in advance in the storage unit 11, thereby serving as the driver 15. Also, the CPU 10 boots the email application program installed in advance in the storage unit 11, thereby serving as a mailer 17.

The driver 15 is equipped with a function to generate the print job to send to the image forming device 5 and a function to detect the email EM1 sent by the administrator and notify. The driver 15 becomes operative after the device driver is booted, and is resident in the CPU 10 until the boot of the device driver is complete. The CPU 10 may, for example, cause the device driver to be resident at the boot of the information processing device 3 by booting the device driver. The device driver is booted and the driver 15 may become operative when the CPU 10 detects a print instruction by the user relating to any application such as a document edit application. The driver 15 then displays a print setting screen on which the user is allowed to give inputs relating to settings based on the user print instruction, and configures the print settings for producing the printed output based on the user inputs relating to the settings.

The mailer 17 includes with a function to receive the email having the user address set as To: address. The mailer 17 becomes operative after the email application program is booted, and is resident in the CPU 10 until the boot of the email application program is complete. The mailer 17 checks if there is any email having the user address set as To: address in a mail server at its boot or a predetermined time during the boot, for instance. If there is any email having the user address set as To: address, the mailer 17 receives the email and stores in the storage unit 11. While it is being booted, the mailer 17 performs the email receiving process on a regular basis. The emails received by the mailer 17 are stored in the storage unit 11.

The storage unit 11 stores therein specific character string information 19 and pop-up definition information 20. The specific character string information 19 relates to the specific character string indicating the setting change at the image forming device 5. Moreover, the storage unit 11 stores therein an email 49 received by the mailer 17 and an email information management table 50 managed by the mailer 17. When the device driver is installed in the storage unit 11, the specific character string information 19 and the pop-up definition information 20 are stored in the storage unit 11 together with the device driver to be installed.

The specific character string information 19 includes specific device information 31 or specific user information 32. The specific device information 31 is referred to identify the image forming device 5 at which the administrator has changed the setting. The specific device information 31 contains the character string which allows to identify the certain image forming device 5. It is assumed that, for example, the administrator sends the email EM1 which notifies the user of the setting change at the an image forming device 5a to the user. In such a case, the administrator inputs the specific character string including the specific device information 31 which allows to identify the image forming device 5a in a title of the email EM1 and sends the email EM1. Thus, the specific character string includes the specific device information 31. As a result, when, for example, the user boots the driver 15 to send the print job to the image forming device 5a, only the email which includes the specific device information 31 as the specific character string to identify the image forming device 5a may be detected of the email EM1 sent by the administrator.

The specific user information 32 is referred to identify the user or the group that uses the image forming device 5 at which the administrator has changed the setting. The specific user information 32 contains the character string which allows to identify the certain user or the certain group to which multiple users are belonged. For asking the certain user or the certain group to change the setting on the device driver, he or she inputs the specific character string including the specific user information 32 in the title of the email EM1, then sends the email EM1. Thus, the specific character string includes the specific user information 32. As a result, when, for example, the user boots the driver 15 to send the print job to the image forming device 5a, only the email which includes the specific user information 32 as the specific character string to identify the user or the user's group of the email EM1 sent by the administrator may be detected. The specific character string information 19 may include other character strings besides the specific device information 31 and the specific user information 32 as described above.

When the email EM1 including the specific character string input in the title is detected by the driver 15, a pop-up notification screen to notify the user that the email EM1 is detected is displayed. The pop-up definition information 20 is referred to display the pop-up notification screen. A screen size of the notification screen and a screen structure such as a display manner or a display position are defined as the pop-up definition information 20.

The email received by the mailer 17 is stored as the email 49. Although only one email 49 is shown in FIG. 2, multiple emails 49 are stored in the storage unit 11. This is because, the mailer 17 receives all the emails having the address of the user of the information processing device 3 set as To: address, and stores all of them in the storage unit 11. The emails received in the past by the mailer 17 include those many emails 49. The email EM1 received from the administrator is one of the emails. The email 49 includes email attribution information 38, a title 39 and a body 40. The attribution information 38 further includes transmission date and time 38a, receipt date and time 38b, a sender 38c and open date and time 38d. The attribution information 38 is applied to the email information management table 50.

Information relating to the email 49 is registered with the email information management table 50. As shown in FIG. 3, information to specify the email 49 including, for instance, transmission date and time 50a, a title 50b, a sender 50c, a message ID 50d, an open flag 50e and open date and time 50f is registered. The message ID is a unique ID to identify a certain email of the internet email or the internet news is assigned to a message, and in this case, is assigned to the email. The user ID assigned to the email is generated on the basis of information such as a domain name, for instance, and allows to identify the certain email. The mailer 17 extracts the information including the transmission date and time 50a, the title 50b, the sender 50c and the message ID 50d, and registers with the email information management table 50 in response to receiving the email. It is assumed, for example, the user opens the unopened email 49 on the mailer 17. In this case, the mailer 17 displays the information of the email 49 on the display device 7. At displaying the information, the mailer 17 assigns the open flag 50e to the email 49, then registers the date and time that the user opened the email as the open date and time, thereby updating the email information management table 50. The mailer 17 extracts the email information including the specific character string in the title 50b from the email information management table 50, and sends a response to the driver 15 in response to receiving a request from the driver 15 at the boot or during the boot of the driver 15.

The driver 15 includes a specific character string information registering part 25, a detecting part 26, a notifying part 27, a job generating part 28 and a job outputting part 29. The specific character string information registering part 25 registers the specific character string information 19 relating to the specific character string specified in advance by the administrator in the storage unit 11 of the information processing device 3. An installer to install the device driver is booted by the CPU 10, for example, and the installation by the installer is proceeded to a predetermined stage, then the specific character string information registering part 25 is ready to become operative. In this case, the specific character string information registering part 25 becomes operative in response to receiving a boot order from the installer. The specific character string information registering part 25 reads the specific character string information 19 registered in advance by the administrator with the installer, and stores the read specific character string information 19 in the storage unit 11, thereby registering it. To be more specific, the specific character string information registering part 25 becomes operative at the installation of the device driver, and stores the information relating to the specific character string embedded in advance in the installer by the administrator in the storage unit 11, thereby registering as the specific character string information 19.

Figure 4:
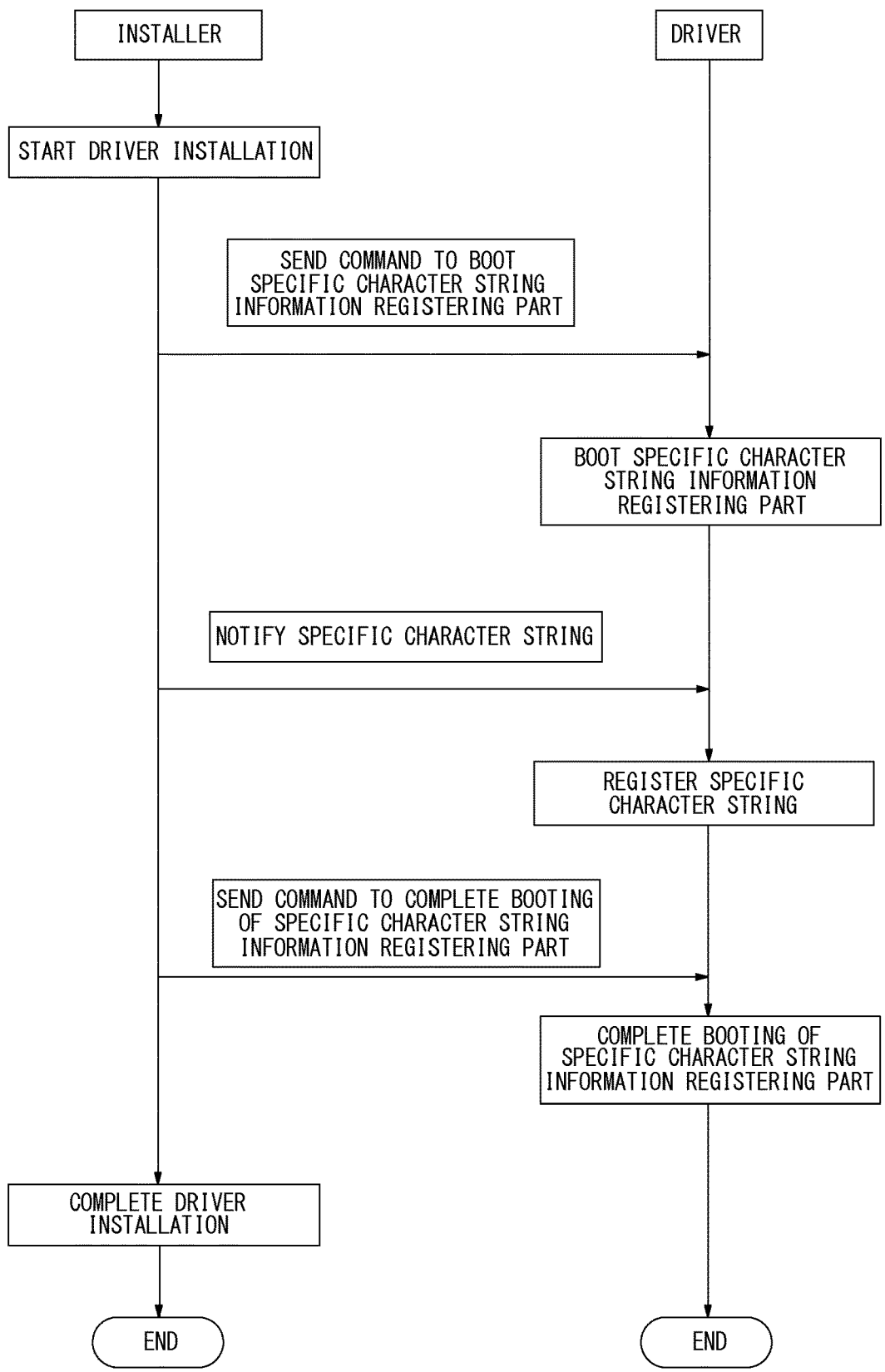
FIG. 4 is a flow diagram explaining an exemplary procedure of a specific character string information registering process.

FIG. 4 is a flow chart explaining an exemplary procedure of a process performed to automatically register the specific character string information 19 when the device driver is installed on the information processing device 3. After starting the installation of the device driver, the installer of the device driver starts the process to store the program or the data of the device driver in the storage unit 11 of the information processing device 3. The process to store the program or the data of the device driver is proceeded to the predetermined state, and it is ready to boot the device driver. The installer then boots the device driver, and brings the driver 15 into operation. The installer sends a command to boot the specific character string information registering part 25 to the driver 15. The driver 15 boots the specific character string information registering part 25 after receiving the command. After booting the specific character string information registering part 25, the installer notifies the specific character string information registering part 25 of the specific character string configured in advance by the administrator. In response to receiving the notification of the specific character string from the installer, the specific character string information registering part 25 registers the notified specific character string as the specific character string information 19 in the storage unit 11. After the specific character string information 19 is registered, the installer sends the command to complete booting of the specific character string information registering part 25 to the driver 15. In response to receiving the command, the driver 15 completes boot of the specific character string information registering part 25. After the temporal boot of the driver 15 is complete, the installer completes all the process to install the device driver. The above-described process is performed at the installation of the device driver, so that the administrator is not required to configure the specific character string for each user individually with the information processing device 3. To be more specific, the administrator records the installer program in which the specific character string information 19 is embedded in advance to the installer to install the device driver in a computer-readable recording medium such as a CD-ROM. The administrator then provides the users with the computer-readable recording medium. As a result, the specific character string information 19 may be installed without any fail with the device driver and may be initially registered with the information processing device 3 of each user, resulting in improvement in the working efficiency.

The specific character string information registering part 25 becomes operative not only when the device driver is installed but also after the installation of the device driver in response to receiving the user boot instruction. It is assumed, for example, the specific character string is added by the administrator. In such a case, it is necessary to update the specific character string information 19 registered with the information processing device 3 of each user. The driver 15 then brings the specific character string information registering part 25 into operation in response to receiving the user boot instruction of the specific character string information registering part 25. As a result, the user makes inputs to additionally register the character string notified in advance by the administrator with the specific character string information 19 as the specific character string, thereby updating the specific character string information 19.

Referring back to FIG. 2, the job generating part 28 becomes operative when the user print instruction is detected. The job generating part 28 displays a print setting screen on the display device 7 and applies the print setting based on the user inputs. Also, the job generating part 28 generates the print job based on the user print job transmission instruction. For generating the print job, the job generating part 28 generates the print job to which the print setting configured by the user is applied. The job generating part 28 generates various types of information configured in advance as additional information, and attaches the additional information to the print job generated based on the user print job transmission instruction. It may be configured to attach the information such as the user ID or the user password to the print job, for example. In such a case, the job generating part 28 attaches the information such as the user ID or the user password to the print job as the additional information in response to generating the print job. It may be configured to attach the information such as the group ID or the group password to the print job, for example. In such a case, the job generating part 28 attaches the information such as the group ID or the group password to the print job as the additional information in response to generating the print job. The additional information is used when the authentication process or the billing process in respect to the print job is performed at the image forming device 5. The information should be attached to the print job differs depend on the operational procedure at the image forming device 5. When some kind of change is made on the operational procedure at the image forming device 5, the setting on the job generating part 28 should be changed first to generate the appropriate additional information.

The job outputting part 29 sends the print job generated by the job generating part 28 to the image forming device 5. The job outputting part 29 sends the print job with the additional information attached by the job generating part 28 to the image forming device 5.

The detecting part 26 detects the email EM1 including the specific character string registered as the specific character string information 19 from among the emails received in the past by the mailer 17 during the boot of the driver 15. The detecting part 26, for example, performs the process to detect the email EM1 including the specific character string when the driver 15 is booted, the user print instruction is detected, or the print job is generated by the job generating part 28. The detecting part 26 performs the process at any of the timings, it is allowed to detect the email EM1 before the print job is sent to the image forming device 5.

The detecting part 26 includes with a function to detect the email EM2 including the specific character string registered as the specific character string information 19 from among the emails received in the past by the image forming device 5 besides the email EM1 received by the mailer 17. The detecting part 26, for example, sends a search request for the email including the specific character string to the image forming device 5 to which the print job is output, thereby detecting the email EM2 including the specific character string from among the emails received in the past by the image forming device 5.

The notifying part 27 becomes operative when the detecting part 26 detects the emails EM1 and EM2 including the specific character string. The notifying part 27 notifies the user of the information relating to the setting change at the image forming device 5 based on the detected emails EM1 and EM2. After the emails EM1 and EM2 notifying that the setting at the image forming device 5 has changed are detected by the detecting part 26, the notifying part 27 refers to the pop-up definition information 20 in the storage unit 11, and generates notification screen information based on the detected emails EM1 and EM2. The notifying part 27 then displays the notification screen on the display device 7. As a result, the user is allowed to notice that there is the email EM1 including the specific character string in the title. If the user has not applied the setting change to the device driver notified through the emails EM1 and EM2 yet, he or she is allowed to make the change on the setting based on the emails EM1 and EM2 then. To be more specific, before inappropriate print job is sent to the image forming device 5 the setting of which is changed by the administrator, the user is allowed to change the setting of the device driver. The user is allowed to set in advance not to display the notification screen displayed by the notifying part 27 even when the emails EM1 and EM2 are detected by the detecting part 26. In such a case, even when the email EM1 is detected by the detecting part 26, the notifying part 27 does not generate the notification screen information.

The detecting part 26 detects the email EM1 including the specific character string from among the emails stored in the mailer 17. In this case, the notifying part 27 is allowed to cause the mailer 17 to display detailed information such as a body of the email EM1. More specifically, the user may give an instruction to display the body of the email EM1 or EM2 on the aforementioned notification screen. In this case, the notifying part 27 sends a request to display the detailed information of the email EM1 including the body to the mailer 17. As a result, the mailer 17 displays the detailed information including the body of the email EM1 including the specific character string on the display device 7. Hence, the user reads the detailed information of the email EM1 displayed by the mailer 17, and he or she is allowed to apply the setting change specified by the administrator to the device driver.

As described above, the mailer 17 is caused by the driver 15 to display the detailed information of the email when the instruction by the user to display the body of the email EM1 is detected. The detailed information of the email is not always displayed in this manner. The notifying part 27 may include a region to display the detailed information including the body of the email EM1 in the notification screen which is a pop-up screen. The detailed information including the body of the email may be displayed in this region. In such a case, the notifying part 27 displays the detailed information including the body of the email on the notification screen, and gives the instruction to assign the open flag 50e to the email. As a result, the mailer 17 assigns the open flag 50e to the email EM1 of the email information management table 50.

The mailer 17 accesses a mail server (which is not shown in figures) connected to the network 4 at a predetermined timing. When the email 49 addressed to the email address of its device set as To: address is stored in the mail server, the mailer 17 automatically receives the email 49 addressed to its device. The mailer 17 includes a driver cooperative part 35 and a display controlling part 36. The driver cooperative part 35 detects the email EM1 including the specific character string from among the emails received in the past in response to receiving the request from the detecting part 26 of the driver 15. The request thereby sent to the driver cooperative part 35 from the driver 15 includes the specific character string information 19. The driver cooperative part 35 reads the email information management table 50 stored in the storage unit 11 and extracts the email EM1 including the specific character string in the title based on the specific character string information 19 included in the request from the driver 15. The email EM1 may be detected. In such a case, the email EM1 in the storage unit 11 is extracted, and the driver cooperative part 35 sends a response that the email EM1 is detected to the detecting part 26. The email EM1 including the specific character string in the title may not be detected. In this case, the driver cooperative part 35 sends the response that the email EM1 is not detected to the detecting part 26.

As described above, when the email EM1 including the specific character string is detected, the notifying part 27 creates the notification screen and notifies the user that the email EM1 is detected. When the instruction by the user to display the detailed information including the body of the email EM1 is detected, the mailer 17, for instance, sends the instruction to display the body of the email EM1 to the driver cooperative part 35. In response to receiving the instruction, the driver cooperative part 35 sends an instruction to display the detail of the email EM1 to the display controlling part 36. In response to receiving the instruction, the display controlling part 36 creates a screen to show the detailed information including the body based on the email EM1, and displays the created screen on the display device 7. Also, the display controlling part 36 assigns the open flag 50e to the email EM1, thereby updating the email information management table 50.

As described above, in the first preferred embodiment, the driver 15 performs the process to detect the email EM1 including the specific character string sent by the administrator when the driver 15 is booted, the user print instruction is detected by the driver 15, or the print job is generated by the driver 15. When the email EM1 including the specific character string is detected as a result of the process, the driver 15 displays the information relating to the change should be made on the setting of the device driver accompanied with the setting change at the image forming device 5 based on the detected email EM1. The user may forget to change the setting on the device driver which was informed via the email EM1 sent by the administrator. Even in such a case, the user can be noticed that he or she has forgotten to change the setting on the device driver when he or she boots the driver 15 to produce the printed output. As a result, the user is allowed to make the change on the setting of the device driver appropriately.

The administrator may often change the setting at the image forming device 5. Many emails EM1 including the specific character string sent by the administrator are stored in the information processing device 3 of each user. When the detecting part 26 of the driver 15 detects every email EM1 including the specific character string sent by the administrator in the past, the notifying part 27 sends multiple notifications based on the many emails EM1. As a result, the user is required to confirm whether or not the change on the setting of the device driver should be made based on the multiple notifications, resulting in lowered operability. When detecting multiple emails EM1 including the specific character string, the detecting part 26 of the driver 15 may extract and detect one of the multiple emails EM1 which indicates the previous transmission date and time sent by the administrator.

Even when the detecting part 26 only detects the previous email EM1 including the specific character string, the setting of the device driver may have already been changed based on the detected previous email EM1. In such a case, notification of the detected email EM1 causes the user to feel more bothersome. When there is any email EM1 which is not opened yet by the user besides the previous email EM1 including the specific character string, it is possible that the setting of the device driver has not been changed yet. For detecting the email EM1 including the specific character string, the detecting part 26 of the driver 15 may only extract and detect the email which is not opened of the stored emails received in the past.

The detecting part 26 may detect the email EM1 including the specific character string any one of the aforementioned timings when the driver 15 is booted, the user print instruction is detected, or the print job is generated by the job generating part 28. The email EM1 needs to be detected during the boot of the driver 15. It is preferably configured to detect the email EM1 including the specific character string when the driver 15 is booted. That is because the email EM1 may be detected and the user may be asked to change the setting on the device driver before he or she starts making inputs such as inputs relating to the print setting. It is assumed, for example, the process to detect the email EM1 including the specific character string is performed when the print job is generated by the job generating part 28. In such a case, the output of the print job generated by the job generating part 28 is preferably temporarily terminated until at least the process to detect the email EM1 is complete. That is because; there is a possibility that the print job generated by the job generating part 28 is not executed at the image forming device 5 properly. When the process to detect the email EM1 is performed when the print job is generated by the job generating part 28, the output of the print job is temporarily terminated until at least the process to detect the email EM1 is complete. As a result, situations in which the print job is not properly executed at the image forming device 5 may be avoided.

Figure 5:
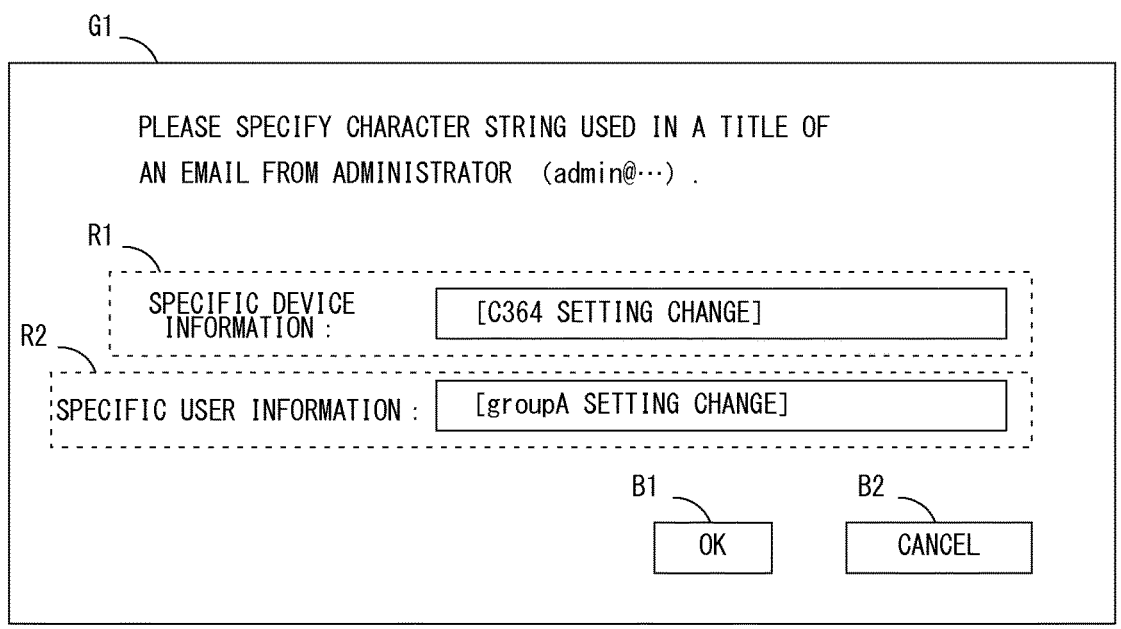
FIG. 5 shows an example of a specific character string information input screen.

An example of the screen to set the specific character string is explained next. FIG. 5 shows an example of the screen to set the specific character string. When the administrator creates the installer of the device driver, for example, a specific character string input screen G1 as illustrated in FIG. 5 is shown at the information processing device 2 used by the administrator. More specifically, an installer creation program is executed at the information processing device 2, and the specific character string input screen G1 is shown at the information processing device 2.

On the specific character string input screen G1, a specific device information setting area R1, a specific user information setting area R2, an OK button B1 and a cancel button B2 are shown. The specific device information 31 relating to the image forming device 5 at which the administrator has made the change on the setting is set by making inputs in the specific device information setting area R1. The specific user information 32 relating to the user or the group that is required to change the setting of the device driver with the change made by the administrator on the setting at the image forming device 5 is set by making inputs in the specific user information setting area R2. The administrator, for example, inputs the character string which allows to identify the image forming device at which the change is made on the setting in the specific device information setting area R1, thereby setting the specific device information 31. Although, in the example of FIG. 5, the character string including one portion of a name such as a production name or a model name of the image forming device is set as the specific device information 31, the character string is not limited to include this information. The administrator inputs the character string which allows to identify the user or the group that is required to change the setting of the device driver in the specific user information setting area R2, thereby setting the specific user information 32. It is assumed that the character string is input in at least one of the specific device information setting area R1 and the specific user information setting area R2, and the OK button B1 is pressed. In such a case, the specific character string information 19 including the character string input in at least one of the areas is generated, and the installer in which the specific character string information 19 is embedded is created. The specific character string information 19 may include information (character string) other than the specific device information 31 or the specific user information 32. When the cancel button B2 on the specific character input screen G1 is pressed, the character string input in each area is deleted. Also, the specific character input screen G1 is deleted.

After the device driver is installed on the information processing device 3 used by the user, the user may boot the driver 15 to bring the specific character string information registering part 25 into operation. Even in such a case, the specific character input screen G1 as the same as described above is displayed on the display device 7. The user is allowed to update the specific character string information 19 as required by giving inputs on the specific character input screen G1. The update of the specific character string information 19 includes addition of new character string to the specific character string information 19 stored in the storage unit 11 at the installation of the device driver, for example.

Figure 6A:
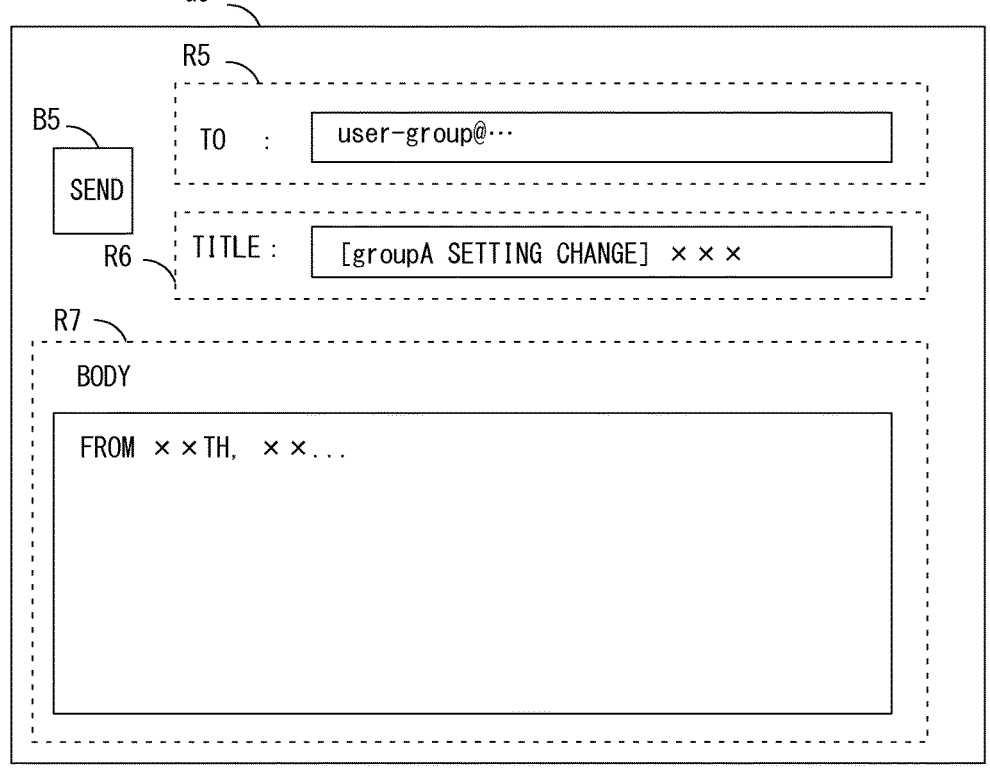
FIGS. 6A and 6B show an example of emails relating to the setting of a print device sent by an administrator.
Figure 6B:
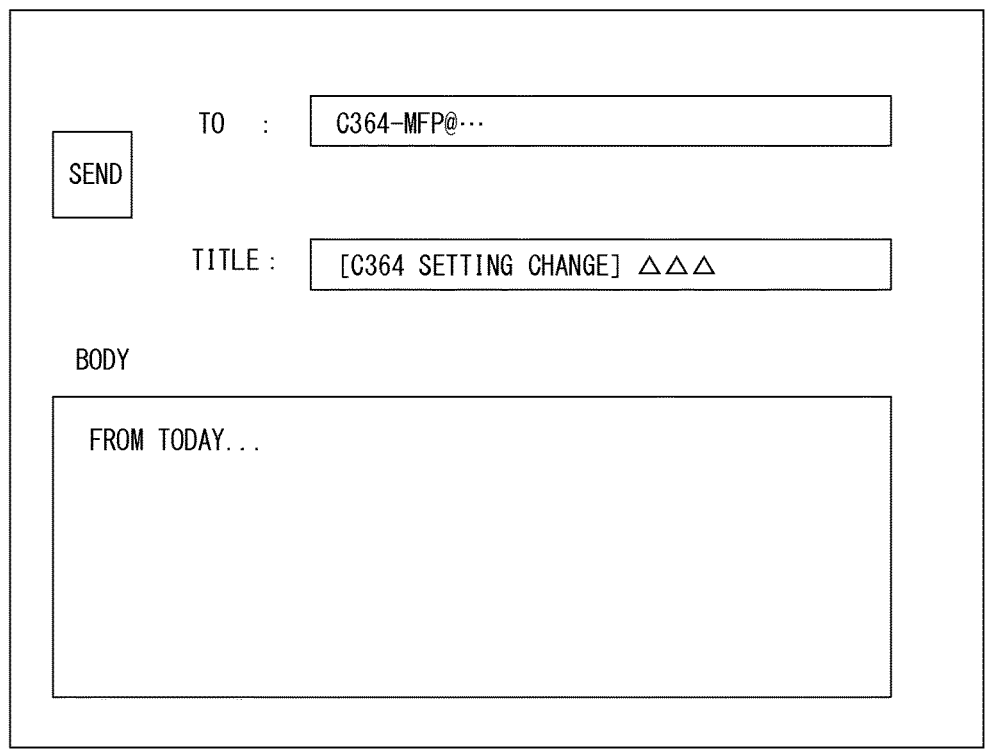

FIGS. 6A and 6B show an example of the screen to create the emails EM1 and EM2 including the specific character string for the administrator to notify of the setting change at the image forming device 5. FIG. 6A shows an example of an email creation screen G5 to create the email which notifies the specific user or group of the setting change on the device driver from the administrator. On the email creation screen G5, an address setting area R5, a title setting area R6, a body setting area R7 and a send button B5 are shown, for example. An email address to which the email is sent is set in the address setting area R5. The title of the email is set in the title setting area R6. The body of the email is set in the body setting area R7. The address setting area R5 includes a field in which the email address designated as the To: address is input. The administrator inputs the email address of the user, group or the image forming device 5 which is designated as the To: address of the email in the aforementioned field. In the example of FIG. 6A, the email address of the specific group is input as the To: address. The title setting area R6 includes a field in which the title of the email is input. The administrator inputs the specific character string includes the specific device information 31 or the specific user information 32 in the aforementioned field. In the example of FIG. 6A, the specific character string includes the specific user information 32 is input. The specific character string includes the specific user information 32 is not necessarily input. The specific character string includes the specific device information 31 may also be input.

It is assumed, for example, that multiple image forming devices 5 are connected to the network 4. In such a case, the device driver to send the print job to each of the multiple image forming devices 5 may be installed separately on the information processing device 3. The driver 15 is then booted at the information processing device 3. When the email EM1 including the specific character string is detected, it is necessary to only detect the email EM1 which notifies of the setting change at the image forming device 5 to which the print job is output by the driver 15. There is no need to detect the email EM1 which notifies of the setting change at the other image forming devices 5. Thus, for sending the email EM1 to the user or the group, the administrator preferably inputs the specific device information 31 to identify the image forming device 5 at which the setting change is made in the title of the email. With the email including the specific device information 31 in the title, the detecting part 26 of the driver 15 is allowed to only extract the email EM1 which notifies of the setting change at the image forming device 5 to which the print job is output by the driver 15.

The body setting area R7 includes a field in which the body of the email is input. The administrator inputs information such as a detailed instruction relating to the setting change on the device driver in the field. The information is input in each field in the address setting area R5, the title setting area R6 and the body setting area R7, and the send button B5 is pressed. In this case, the information input in each area is set as the To: address, the title and the body, and sent. The mailer 17 of the information processing device 3 of the user then receives the email, and stores in the storage unit 11 as the email 49. When storing the email EM1, the information such as the title of the email EM1 is extracted and registered in the email information management table 50. Thus, the driver cooperative part 35 is allowed to extract the email EM1 including the specific character string from the email information management table 50.

FIG. 6B shows an example of the email creation screen G5 to create the email EM2 which is sent to the specific image forming device 5 from the administrator. In the example of FIG. 6B, the email address of the specific image forming device 5 at which the administrator has made the setting change is input in the address setting area R5, and the specific device information 31 which may identify the image forming device 5 is input in the title setting area R6. The specific device information 31 is not necessarily input in the title setting area R6. The specific user information 32 may be input.

It is assumed, for example, the administrator changes an authentication procedure of the specific group as the setting change made by the administrator at the image forming device 5. In such a case, although the setting change of the device driver at the information processing device 3 used by each user of the specific group is required, the setting change of the device driver at the information processing device 3 used by the user who does not belong to the specific group is not required. Thus, when the driver 15 is booted at the information processing device 3 and the email EM2 including the specific character string is detected, it is necessary to detect only the email EM2 which identifies with the specific character string the user of the information processing device 3 or the group of the user. It is not necessary to detect the email EM2 which identifies with the specific character string the other users of the information processing devices 3 or the other groups of the users. In sending the email EM2 which is addressed to the image forming device 5, it is preferable to have the administrator to input the specific user information 32 to identify the user or the group who is required to make the setting change of the device driver in the title of the email. With the specific user information 32 in the title of the sent email, the detecting part 26 of the driver 15 is allowed to only extract the email EM2 which identifies the user from among the emails stored in the image forming device 5.

After the send button is pressed by the administrator, the information input in each area is set as the corresponding To: address, title and body, and the email EM2 including such information is sent, which is the same as the example in FIG. 6A. The mailer (which is not shown in figures) of the image forming device 5 receives the email EM2, and the information in the title and the body is stored in a predetermined storage unit in the image forming device 5. The user may boot the driver 15 of the information processing device 3, and the detecting part 26 may send a request to search for the email EM2 including the specific character string to the image forming device 5. The image forming device 5 then searches for the email EM2 including the specific character string as requested by the detecting part 26, and responses to the detecting part 26. It is assumed, for example, that the email EM2 which notifies of the setting change at the image forming device 5 is sent by the administrator to only the image forming device 5. Even in such a case, the detecting part 26 is allowed to obtain and detect the email EM2 including the specific character string from the image forming device 5 during the boot of the driver 15. After the email EM2 including the specific character string is detected by the detecting part 26, the notifying part 27 is allowed to notify the user of the necessity of the setting change of the device driver based on the email EM2. After the user boots the driver 15 of his or her information processing device 3, he or she is allowed to check the email EM2 sent by the administrator only to the image forming device 5. As a result, the user is allowed to generate the print job after applying the setting change on the device driver based on the instruction by the administrator and output the generated print job to the image forming device 5.

An example of each screen displayed on the display device 7 during the boot of the driver 15 is explained next.

Figure 7:
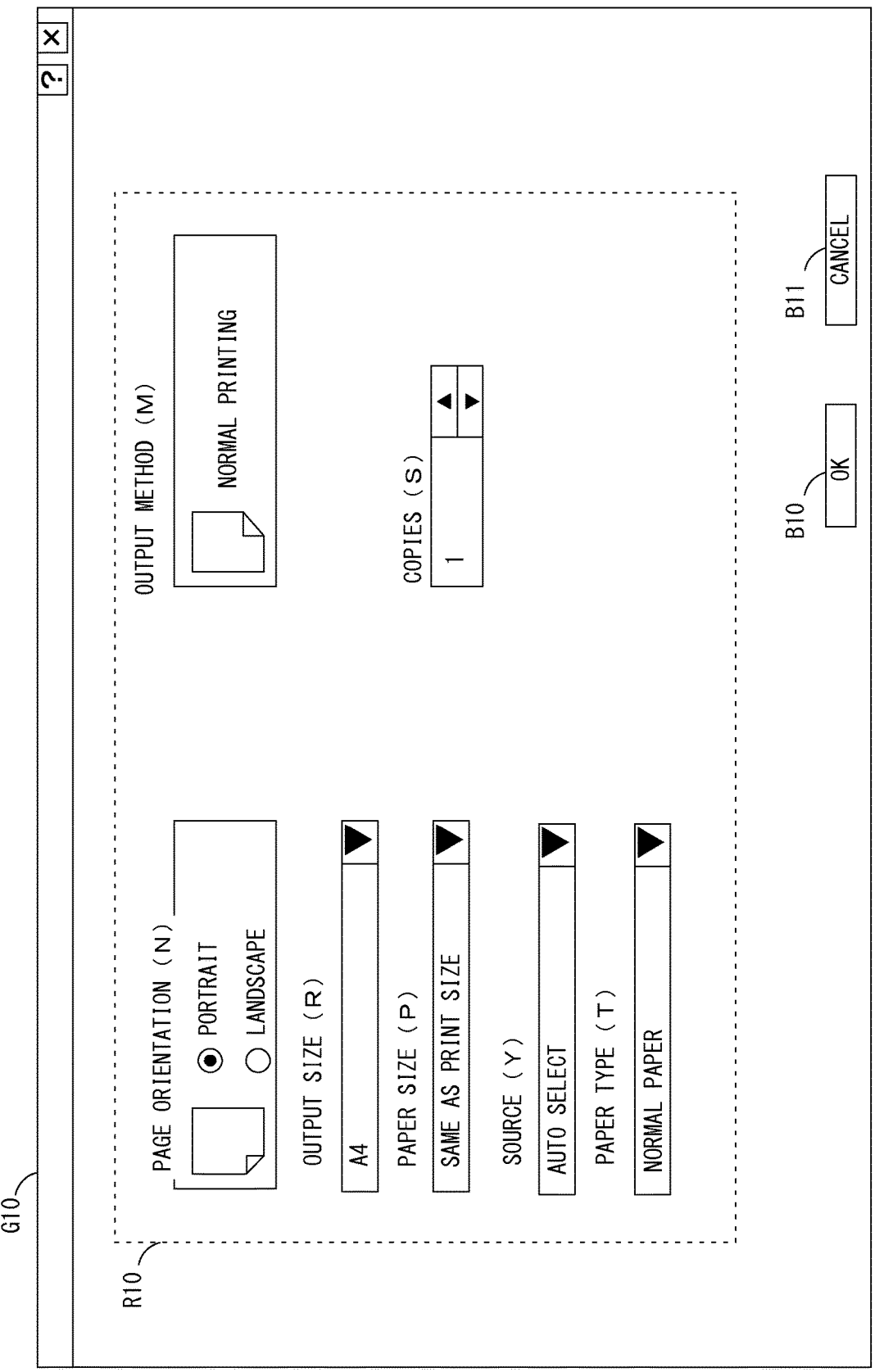
FIG. 7 shows an example of a print setting screen.

FIG. 7 shows an example of a print setting screen C10 displayed by the driver 15. After the driver 15 is booted, the driver 15 reads print setting screen information and initial values (not shown in figures) of each setting item stored in advance in the storage unit 11, and creates the print setting screen G10, then displays the created print setting screen G10 on the display device 7. On the print setting screen G10, the user is allowed to make inputs relating to the various types of the print settings. To be more specific, on the print setting screen G10, an item setting area R10, a print button B10 and a print cancel button B11 are shown. Multiple setting items are shown in the item setting area R10, and the user is allowed to configure the value of each setting item. A default value is set in advance for each setting item in the item setting area R10. After the print setting screen G10 is displayed, the default value is shown for each setting item. The user is allowed to change the value of the setting value of each setting item in the item setting area R10 from default to any value. The user presses the print button B10 after he or she changes the setting value of each setting item to any value he or she desires. The job generating part 28 then generates the print job to which the setting value of each setting item configured by the user is applied. On the other hand, the print cancel button B11 may be pressed. In such a case, the driver 15 deletes the print setting screen G10 without generating the print job, and completes boot.

Figure 8:
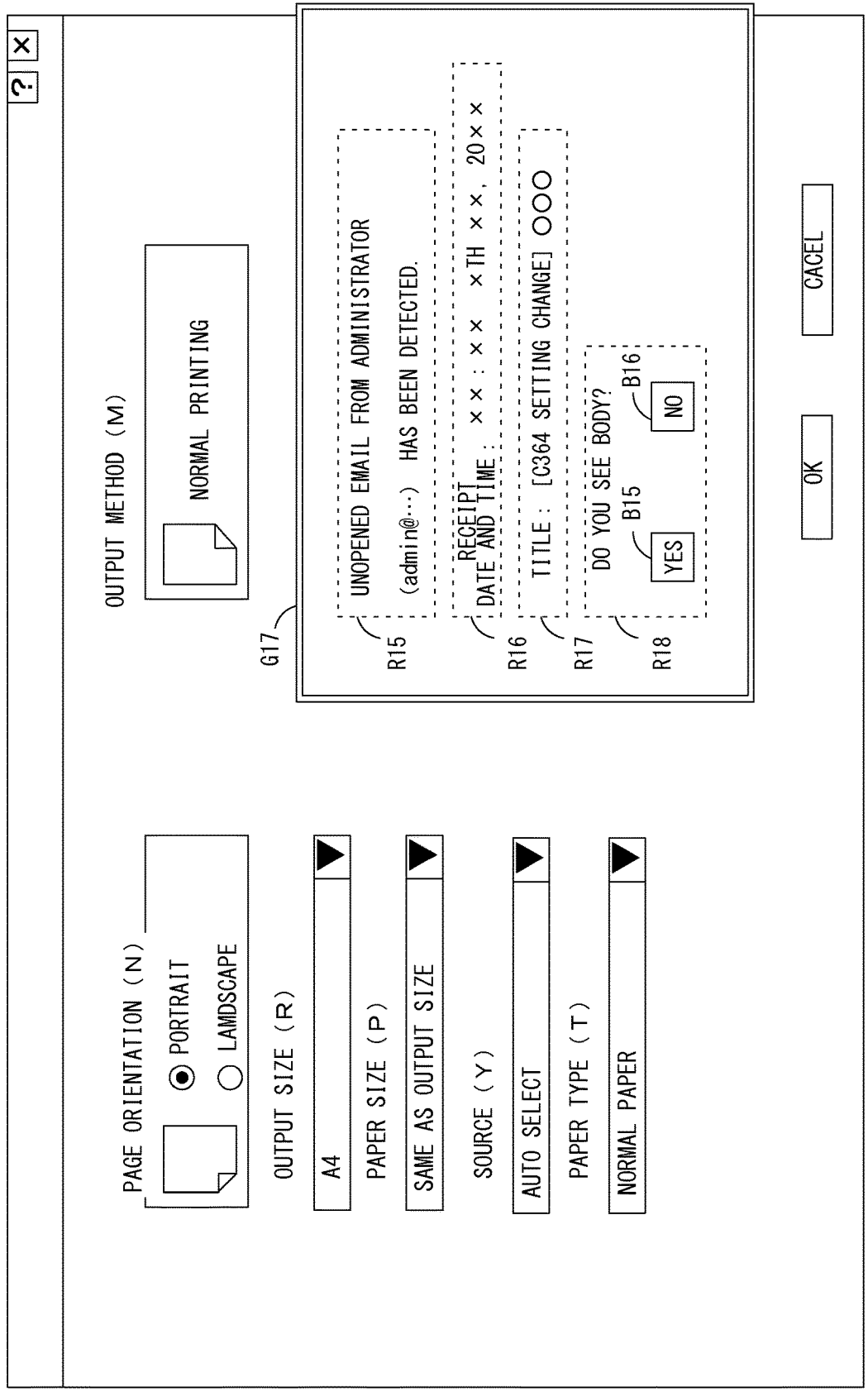
FIG. 8 shows an example of a notification screen which notifies the detection of the email relating to the setting of the print device.

FIG. 8 shows an example of a pop-up notification screen when the emails EM1 and EM2 including the specific character string are detected during the boot of the driver 15. It is assumed, for example, that the aforementioned print setting screen G10 of FIG. 7 is displayed, and the user is making inputs relating to each setting item of the print settings. In such a case, the detecting part 26 is allowed to perform the process to detect the emails EM1 and EM2 including the specific character string in the background of the print settings operation made by user. After the emails EM1 and EM2 including the specific character string are detected by the detecting part 26, the notifying part 27 becomes operative at the driver 15. The notifying part 27 creates a notification screen G17 as shown in FIG. 8 and displays on the display device 7 based on the emails EM1 and EM2 detected by the detecting part 26. To be more specific, after the emails EM1 and EM2 including the specific character string are detected by the detecting part 26, the notifying part 27 reads the pop-up definition information 20, then displays the notification screen G17 in front of the print setting screen G10 in a manner defined by the pop-up definition information 20. The pop-up definition information 20 defines a size, position or a display manner, for example. On the notification screen G17, a notification area R15, a receipt date and time area R16, a title area R17 and a body area R18 are shown. It is shown that the emails EM1 and EM2 including the specific character string are detected in the notification area R15. The date and time when the emails EM1 and EM2 are detected are shown in the receipt date and time area R16. The title of the emails EM1 and EM2 is shown in the title area R17. The detailed information such as a body of the emails EM1 and EM2 is displayed in the body area R18 based on the user instruction. As a result, the user is allowed to change the setting of the device driver after confirming the instruction by the administrator when he or she configures the setting of each print setting item.

When the email received from the email address of the administrator, and includes the specific character string is detected, the notification is shown in the notification area R15. In the example of FIG. 8, the emails EM1 and EM2 which are not opened by the user of the emails EM1 and EM2 including the specific character string are detected. This screen is allowed to notify the user of the emails which have not been confirmed yet relating to the instructions as to the print settings by the administrator. The notifying part 27 displays the receipt date and time of the emails EM1 and EM2 based on the receipt date and time 38b of the emails EM1 and EM2 in the receipt date and time area R16. The title of the email is shown in the title area R17. The title including the specific character string, for instance, is shown. The notifying part 27 displays the titles of the emails EM1 and EM2 based on the title 39 of the emails EM1 and EM2. By seeing the titles of the emails EM1 and EM2 on the notification screen G17, the user is allowed to imagine that the setting has changed at the image forming device 5 to which the user is going to output the print job. Thus, the user is allowed to determine whether or not it is necessary to display the whole body of the emails EM1 and EM2 to confirm.

In the body area R18, a body display button B15 and a cancel button B16 that can be pressed by the user are shown. A question, for instance, is displayed in the body area R18 to confirm the user whether or not to display the body of the email. When the user determines not to display the body, he or she presses the cancel button B16. In response to detecting that the cancel button B16 is pressed, the notifying part 27 deletes the notification screen G17. When the user determines to display the body, he or she presses the body display button B15 to give the instruction to display the body of the emails EM1 and EM2 as the detailed information. It is assumed, that, for example, the email EM1 is extracted by the mailer 17, and the body display button B15 is pressed by the user. In this case, the notifying part 27 sends the request to the driver cooperative part 35 of the mailer 17 to display the body of the email EM1. The driver cooperative part 35 gives the instruction to display the body of the email EM1 to the display controlling part 36. The display controlling part 36 then creates a received email display screen to show the body of the email EM1 based on received email display screen information.

After the print job is generated by the job generating part 28, the detecting part 26 may start the process to detect the emails EM1 and EM2. In such a case, the print job is not sent to the image forming device 5 at least until the detecting process is complete. After the email EM1 is detected by the detecting part 26 and the notification screen G17 is displayed by the notifying part 27, the print job generated by the job generating part 28 is canceled. Thus, the user is allowed to notice that there are emails EM1 and EM2 including the specific character string sent by the administrator before the printed output is produced by the image forming device 5 based on the print job. Also, the user is allowed to give the instruction to generate the new print job after making the variety of setting changes at the device driver based on the instruction by the administrator, and to produce the printed output.

Figure 9:
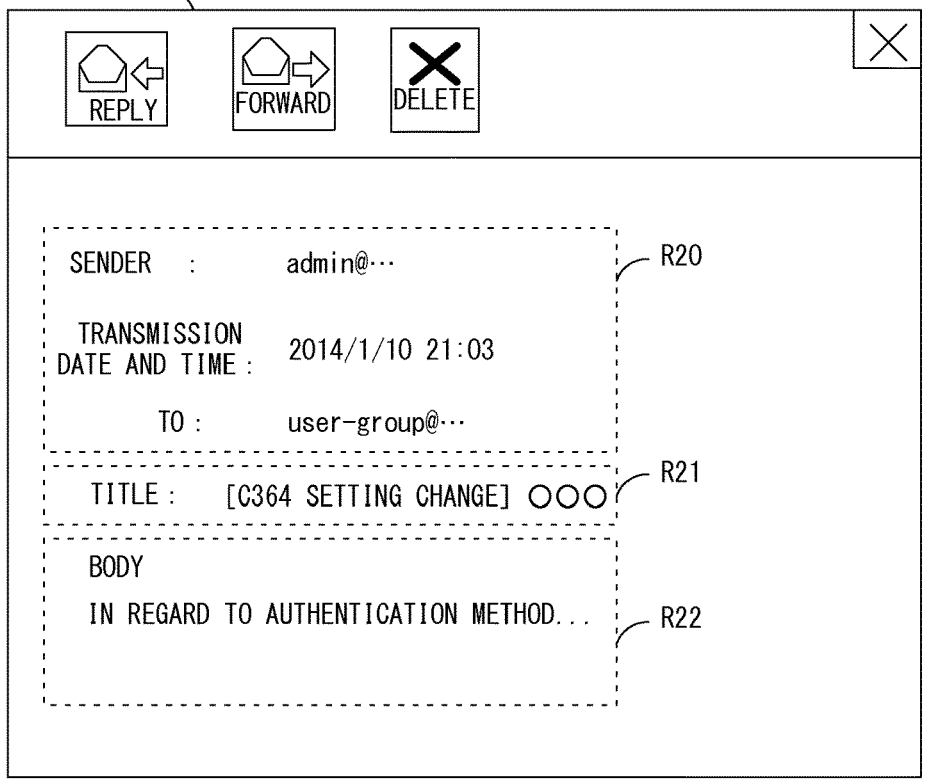
FIGS. 9A and 9B show an example of the notification screens which shows a body of the email relating to the setting of the print device.

FIG. 9A shows an example of the received email display screen to display the detailed information of the emails EM1 and EM2. On the received email display screen G20, an attribution information area R20, a title area R21 and a body area R22 are shown. Information including the sender 38c, the transmission date and time 38a and the address set as To: address included in the attribution information 38 of the emails EM1 and EM2, for example, is displayed in the attribution information area R20. The title 39 of the emails EM1 and EM2 is displayed in the title area R21. The body of the emails EM1 and EM2 is displayed in the body area R22. The information displayed on the received email display screen G20 is not limited to this. The other information may be displayed on the received email display screen G20. The driver cooperative part 35 extracts the information including the sender, the transmission date and time and the address set as To: address, for instance, and the information is displayed in the attribution information area R20 based on the attribution information 38 of the emails EM1 and EM2 stored by the detecting part 26 in the memory. The title of the emails EM1 and EM2 is displayed in the title area R21 based on the title 39 of the emails EM1 and EM2. The body of the emails EM1 and EM2 is displayed in the body area R22 based on the body 40 of the emails EM1 and EM2. Thus, the user is allowed to see the detailed information relating to the emails EM1 and EM2 including the body, and to cause the printed output to be produced after applying the instruction by the administrator displayed in the body to the setting of the device driver.

FIG. 9B shows an example of a notification screen G25 when the body of the emails EM1 and EM2 is displayed, which is different from the screen of FIG. 9A. In response to detecting that the body display button B15 is pressed by the user, the notifying part 27 displays the body of the emails EM1 and EM2 in a body area R25 based on the body 40 of the emails EM1 and EM2 stored in the memory. A confirm button B25 is shown in the body area R25. When the user presses the confirm button B25, the notifying part 27 deletes the notification screen G25.

The body of the email EM1 is displayed on the notification screen G25 as illustrated in FIG. 9B based on the email EM1 extracted by the mailer 17. In such a case, the notifying part 27 displays the body in the body area R25, and performs a process to update the information relating to the email EM1 from unopened status to opened status. To be more specific, in response to detecting that the body display button B15 is pressed, the notifying part 27 sends the instruction to perform the process to update the information relating to the email EM1 to the opened status to the mailer 17. The driver cooperative part 35 of the mailer 17 registers the information such as the date and time when the body display button B15 is pressed as the open date and time 38d in response to receiving the instruction. The driver cooperative part 35 assigns the open flag 50e to the email EM1, then updates the email information management table 50. Hence, the email EM1 is considered as the opened email. Even when the user boots again the driver 15, the email EM1 is not considered as unread email.

Figure 10:
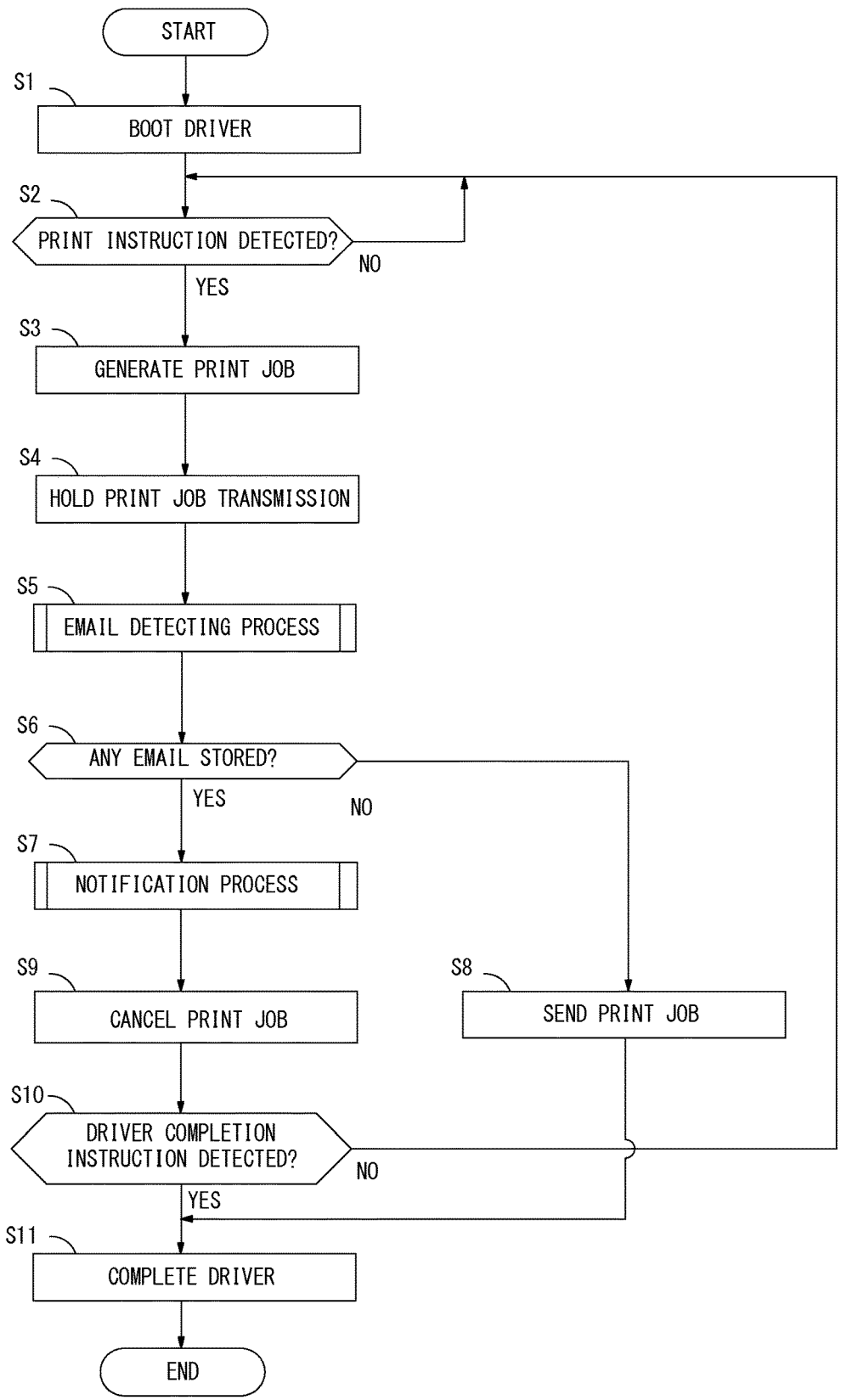
FIG. 10 is a flow diagram explaining an exemplary procedure of a process mainly performed at the information processing device including with the print setting notification function.

The detailed procedure of a process performed by the driver 15 of the information processing device 3 is explained next. The procedure of a process performed when the process to detect the unopened email EM1 which includes the specific character string in the title is performed by the detecting part 26 soon after the print job is generated by the job generating part 28 is explained as an example below. FIG. 10 is a flow diagram explaining an exemplary procedure of a process as to the print setting performed after the driver 15 boots and until completing booting. After the device driver boots on the information processing device 3 to serve as the driver 15 (step S1), the driver 15 determines whether or not the user print instruction is detected while the print setting screen is displayed (step S2). With no detected user print instruction (when a result of step S2 is NO), the driver 15 is put into a standby state until detecting the print instruction.

With the detected user print instruction (when a result of step S2 is YES), the job generating part 28 generates the print job (step S3). In general, after the print job is generated, the print job is output to the image forming device 5, and the image forming device 5 produces the printed output based on the received print job. According to the present invention, even when the print job is generated by the job generating part 28, the generated print job is not output to the image forming device 5 immediately. The job outputting part 29 holds transmission of the print job (step S4), and performs the email detecting process (step S5). In the email detecting process, the unopened email which is sent by the administrator and includes the specific character string in the title is detected. The administrator may have given the instruction as to the print setting, for instance, by the email to the user, and the user has not opened the email yet so that the print job is not generated with the updated print setting applied. In such a case, the print job is not output to the image forming device 5 until the email detecting process is complete. Thus, the unappropriated printing is not produced. The detail of the email detecting process (step S5) is explained later.

After the unopened email is extracted through the email detecting process, the detecting part 27 determines whether or not the unopened email is stored in the storage unit such as the memory, for instance (step S6). The unopened email may not be extracted through the email detecting process, and the email is not stored in the memory (when a result of step S6 is NO). In such a case, the job outputting part 29 sends the print job to the image forming device 5 (step S8), and completes boot of the driver 15 (step S11) to complete the whole process. The unopened email may be extracted through the email detecting process, and stored in the memory (when a result of step S6 is YES). In such a case, the notifying part 27 performs the notification process to notify the user that the unopened email is detected (step S7). The detail of the notification process (step S7) is explained later.

After the notification process to notify the user that the unopened email is detected, the job outputting part 29 cancels the print job the output of which to the image forming device 5 has been pending (step S9). When the unopened email is detected, it is often the instruction, for instance, by the administrator has not been applied to the print setting. Therefore, if the print job which does not apply the print setting as instructed by the administrator is sent to the image forming device 5, the print output is produced inappropriately. In order to avoid the print output to be produced inappropriately, the print job is canceled. After the print job is canceled, the driver 15 determines if the instruction to complete boot of the driver 15 is given by the user (step S10). When the instruction to complete boot of the driver 15 is detected (when a result of step S10 is YES), the boot of the driver 15 is completed (step S11), and the process as to the print setting is complete. When the instruction to complete boot of the driver 15 is not detected (when a result of step S10 is NO), the driver 15 returns to step S2 to perform the process in steps S2 to S10 until the boot of the driver 15 is completed.

Figure 11:
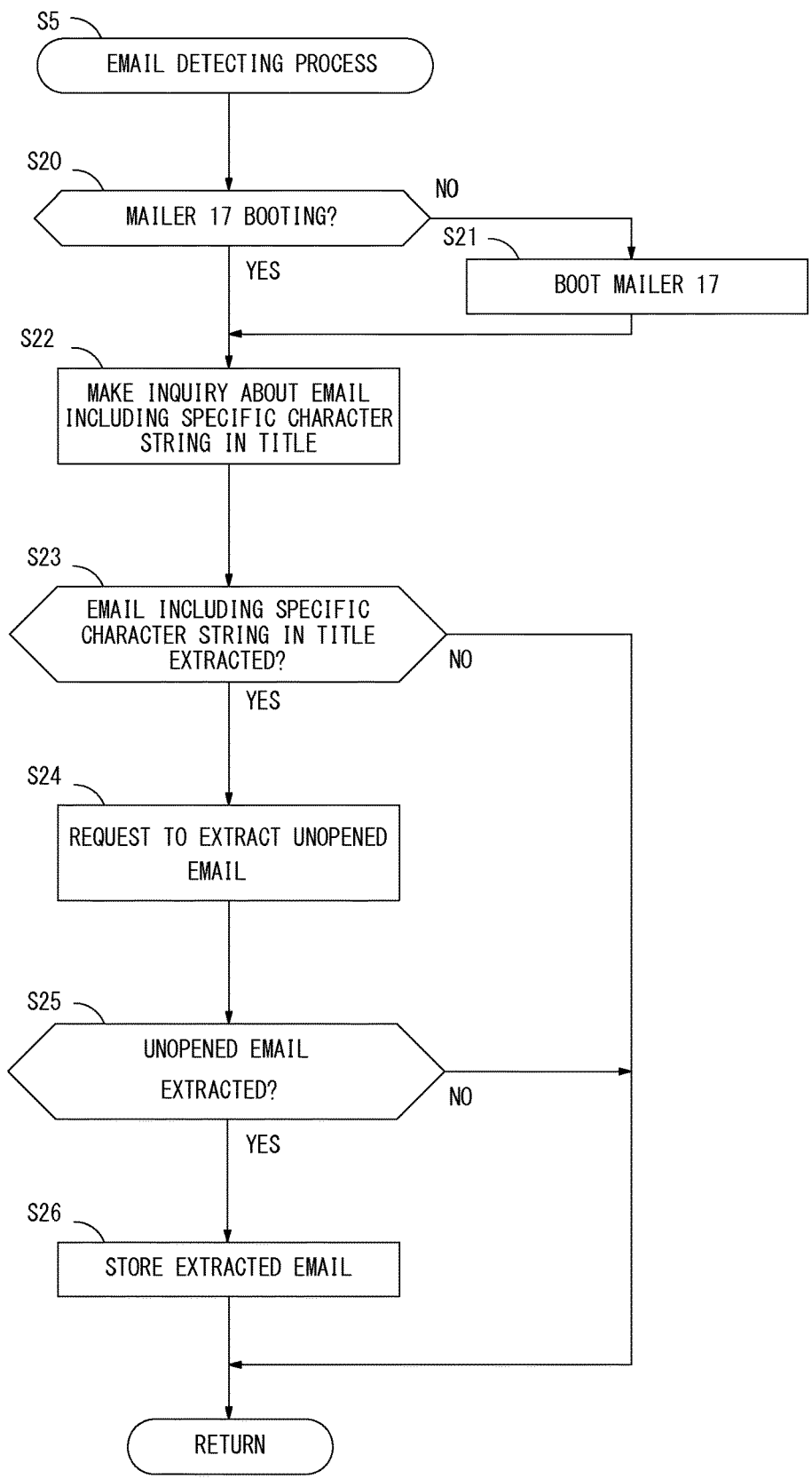
FIG. 11 is a flow diagram explaining in detail an exemplary email detecting process (step S5 of FIG. 10)

FIG. 11 is a flow diagram explaining in detail an exemplary email detecting process (step S5 of FIG. 10). The email detecting process is mainly performed by the detecting part 26. The detecting part 26 determines whether or not the mailer 17 is in booting (step S20). When the mailer 17 is not in booting (when a result of step S20 is NO), the mailer 17 is booted (step S21). In order to make an inquiry to the mailer 17 whether or not the email EM1 which is sent by the administrator and includes the specific character string in the title, the mailer 17 needs to be booting as described later. When the mailer 17 is in booting (when a result of step S20 is YES), the process in step S21 is skipped. The detecting part 26 makes an inquiry to the driver cooperative part 35 of the mailer 17 whether or not the email EM1 which is sent by the administrator and includes the specific character string in the title is stored in the storage unit 11 as the mailer 17 is in booting (step S22). In response to receiving the inquiry, the driver cooperative part 35 reads the email information management table 50 and extracts the email EM1 which is sent by the administrator and includes the specific character string in the title.

After extracting the email EM1 which is sent by the administrator and includes the specific character string in the title, the driver cooperative part 35 sends the response to the detecting part 26 whether or not the email EM1 is extracted. With receipt of this response, the detecting part 26 determines whether or not the email which is sent by the administrator and includes the specific character string is received (step S23). No email may be extracted (when a result of step S23 is NO). In such a case, the detecting part 26 completes the email detecting process. When one or more email is extracted (when a result of step S23 is YES), the detecting part 26 sends a request to the driver cooperative part 35 to extract the unopened email of the extracted one or more email (step S24).

In response to receiving the request from the detecting part 26, the driver cooperative part 35 refers to the email information management table 50 to extract the email to which the open flag 50e is not assigned of the extracted email, then sends the response to the detecting part 26. After receiving the response from the driver cooperative part 35, the detecting part 26 determines if any unopened email is extracted (step S25). If no opened email is extracted (when a result of step S25 is NO), the detecting part 26 completes the email detecting process. If there is any unopened email (when a result of step S26 is YES), the detecting part 26 sends the instruction to the driver cooperative part 35 to read the information including the email attribution information 38, the title 39 and the body 40 relating to the extracted unopened email and stores the read information in the memory (step S26). The detecting part 26 then completes the email detecting process. The detecting part 26 of the first preferred embodiment extracts the unopened email via the driver cooperative part 35 of the mailer 17. The detecting part 26 is not necessarily extract the unopened email via the driver cooperative part 35. The detecting part 26 may extract the email based on the email information management table 50.

Figure 12:
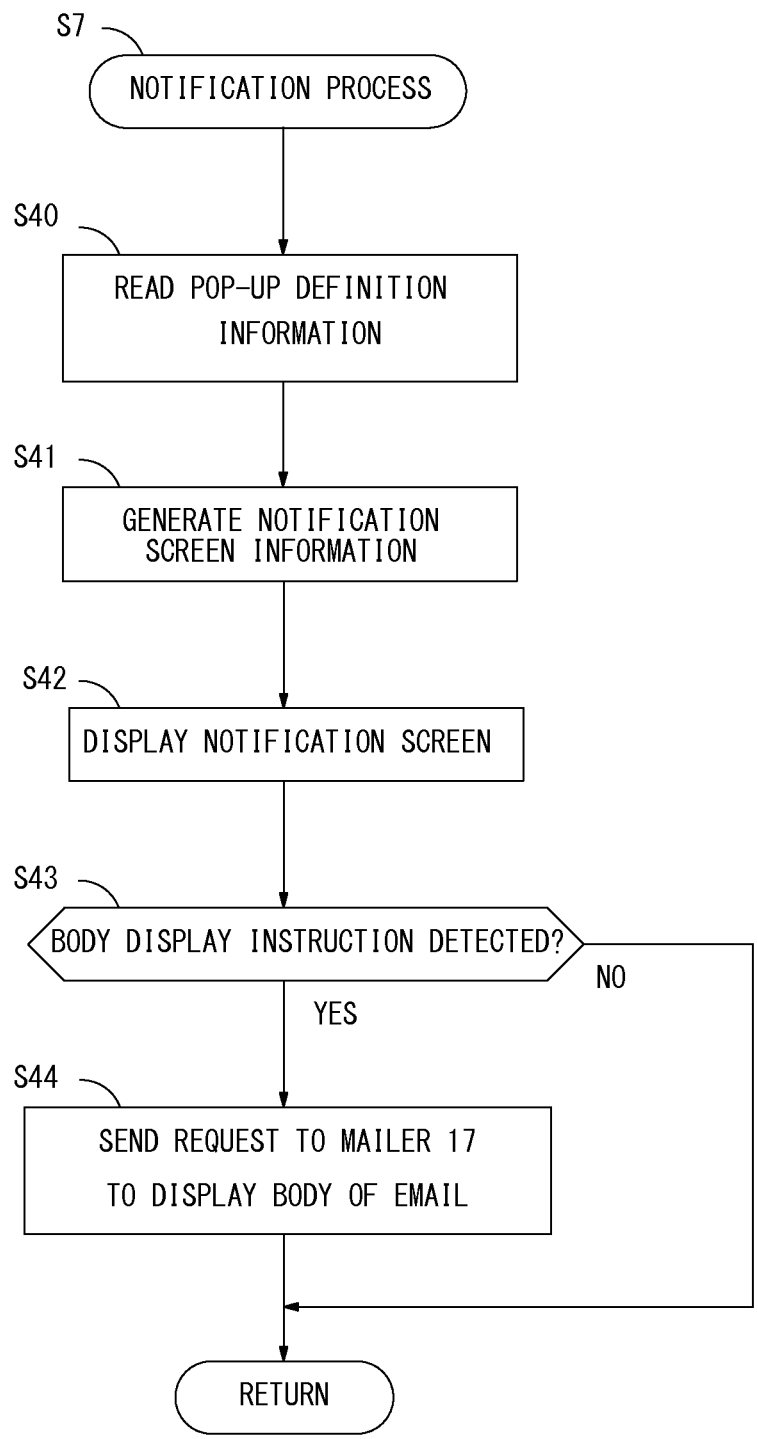
FIG. 12 is a flow diagram explaining in detail an exemplary notification process (step S7 of FIG. 10)

FIG. 12 is a flow diagram explaining in detail an exemplary notification process (step S7 of FIG. 10). The notification process is mainly performed by the notifying part 27. The opened email which includes the specific character string in the title may be stored in the memory. In this case, the notifying part 27 reads the pop-up definition information 20 (step S40), then generates the notification screen information based on the pop-up definition information 20 and the information relating to the email stored in the memory (step S41). The notifying part 27 displays the notification screen on the display device 7 based on the notification screen information (step S42). The notifying part 27 then determines if the instruction to display the body as the notification screen is being displayed (step S43). The notifying part 27 may determine that the instruction to display the body is not detected (when a result of step S43 is NO). In such a case, the notifying part 27 completes the notification process.

When determining that the instruction to display the body is detected (when a result of step S43 is YES), the notifying part 27 sends the request to the mailer 17 to display the detail of the extracted email, then completes the notification process (step S44). More specifically, the notifying part 27 sends the request to the driver cooperative part 35 to display the detail of the email. In response to receiving the request, the driver cooperative part 35 gives the instruction to the display controlling part 36 to display the detail of the email. The display controlling part 36 creates the received email display screen relating to the email, and displays the created screen on the display device 7. When the received email display screen is displayed, the mailer 17 assigns the open flag to the email and updates the email information management table 50. As a result, the email is not extracted again as the unopened mail when the user boots the driver 15 to produce the printed output later. In FIG. 12, the mailer 17 performs the process to display the detail of the email in response to detecting the instruction to display the body. The mailer 17 is not necessarily perform the process. The notifying part 27 may perform the process to display the body of the email. Even in such case, it is necessary to avoid that the email to be extracted again as the unopened mail when the user boots the driver 15 to produce the printed output later. In order to avoid that, the open flag is assigned to the email and the email information management table 50 is updated.

Next, an example when the email EM2 which is sent by the administrator to the image forming device 5 and includes the specific character string in the title is extracted is explained. In some cases, the administrator sends the email EM2 to the image forming device 5 at which the operational procedure has changed. The email EM2 thereby sent notifies the setting change at the image forming device 5. The user may uses the information processing device 3 to output the job to the image forming device 5. In this case, the driver 15 makes the inquiry to the image forming device 5 if there is any email EM2 which includes the specific character string in the title in the emails stored therein. When the email EM2 which includes the specific character string in the title is stored in the image forming device 5, the email EM2 is extracted, and the driver 15 notifies the user of the email EM2. Thus, the user is allowed to know the setting change at the image forming device 5 and if the setting change of the device driver is required.

When all the emails EM2 each of which includes the specific character string in the title in the image forming device 5 are extracted, the huge amount of the emails may be extracted. The emails EM2 thereby extracted include the email EM2 which has already been extracted before. Thus, the user takes a long time to check the extracted email EM2. It is not necessary to extract again the email EM2 which has already been extracted in response to receiving the request from the driver 15. Such email EM2 is not extracted by assigning an extracted flag to the email EM2 at the image forming device 5, and the email EM2 to which the extracted flag is assigned should not be extracted. As a result, the email EM2 which has already been extracted before and notified the user is not extracted again, resulting in improvement in the email EM2 checking efficiency.

Figure 13:
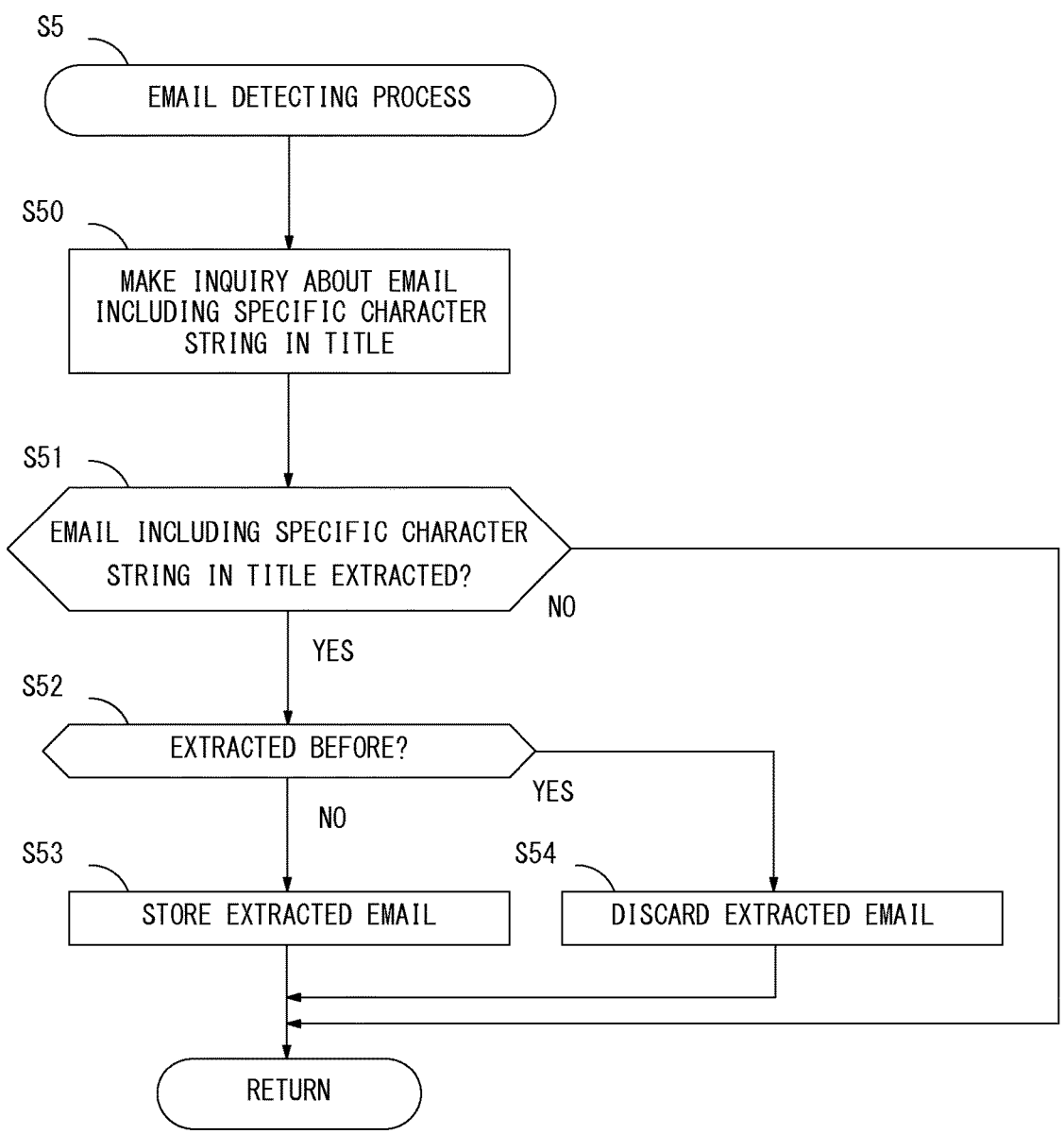
FIG. 13 is a flow diagram explaining in detail an exemplary email detecting process (step S5 of FIG. 11) to detect the unopened email stored in the print device.

FIG. 13 is a flow diagram explaining an exemplary email detecting process (step S5 of FIG. 11) to detect the email EM2 which includes the specific character string in the title from among the emails stored in the image forming device 5 when the user uses the information processing device 3 to output the job to the image forming device 5. The email detecting process is mainly performed by the detecting part 26. The detecting part 26 makes an inquiry to the image forming device 5 if there is any email EM2 which includes the specific character string in the title in the emails stored therein (step S50). After the image forming device 5 receives the inquiry, an email managing part, for instance, of the image forming device 5 is brought into operation to search for the email EM2 which includes the specific character string in the title. After searching for the email EM2, the image forming device 5 sends the response to the detecting part 26 to notify the result of the search. In response to receiving the response, the detecting part 26 determines whether or not the email EM2 which includes the specific character string in the title is extracted (step S51). When no email EM2 is extracted (when a result of step S51 is NO), the detecting part 26 completes the email detecting process. The email EM2 may be extracted (when a result of step S51 is YES). In such a case, the detecting part 26 makes an inquiry to the image forming device 5 whether or not the email EM2 thereby extracted has already been extracted before in response to the inquiry from the detecting part 26. The image forming device 5 determines whether or not the extracted flag is assigned to the email EM2 thereby extracted, and sends the response to the detecting part 26 to notify the determination result. After receiving the response, the detecting part 26 determines if the extracted email EM2 has already been extracted before (step S52). When the extracted email EM2 has never been extracted (when a result of step S52 is NO), the detecting part 26 stores the extracted email EM2 in the storage unit such as the memory (step S53), then completes the email detecting process. As a result, the extracted email EM2 may be notified to the user through the notification process (step S7 of FIG. 10). The notified user is allowed to read the email EM2 and know the setting change at the image forming device 5.

The extracted email EM2 may have been extracted before (when a result of step S52 is YES). In such a case, the detecting part 26 discards the extracted email EM2 (step S54), then completes the email detecting process. Thus, the email EM2 which has been extracted before is not notified to the user, resulting in improvement in the email EM2 checking efficiency.

The present invention causes the information processing device to serve as the detecting part to detect the email relating to the setting change of the output device which includes the specific character string from among the emails which have been received in the past during the boot of the device driver and the notifying part to notify the user when the email is detected by the detecting part. The user may leave the email relating to the setting change of the output device without checking it. In such a case, the user is notified of the email. As a result, the user is allowed to check the email and take an appropriate action in accordance with the information based on the email in regard with the setting change of the output device.

Second Preferred Embodiment

Figure 14:
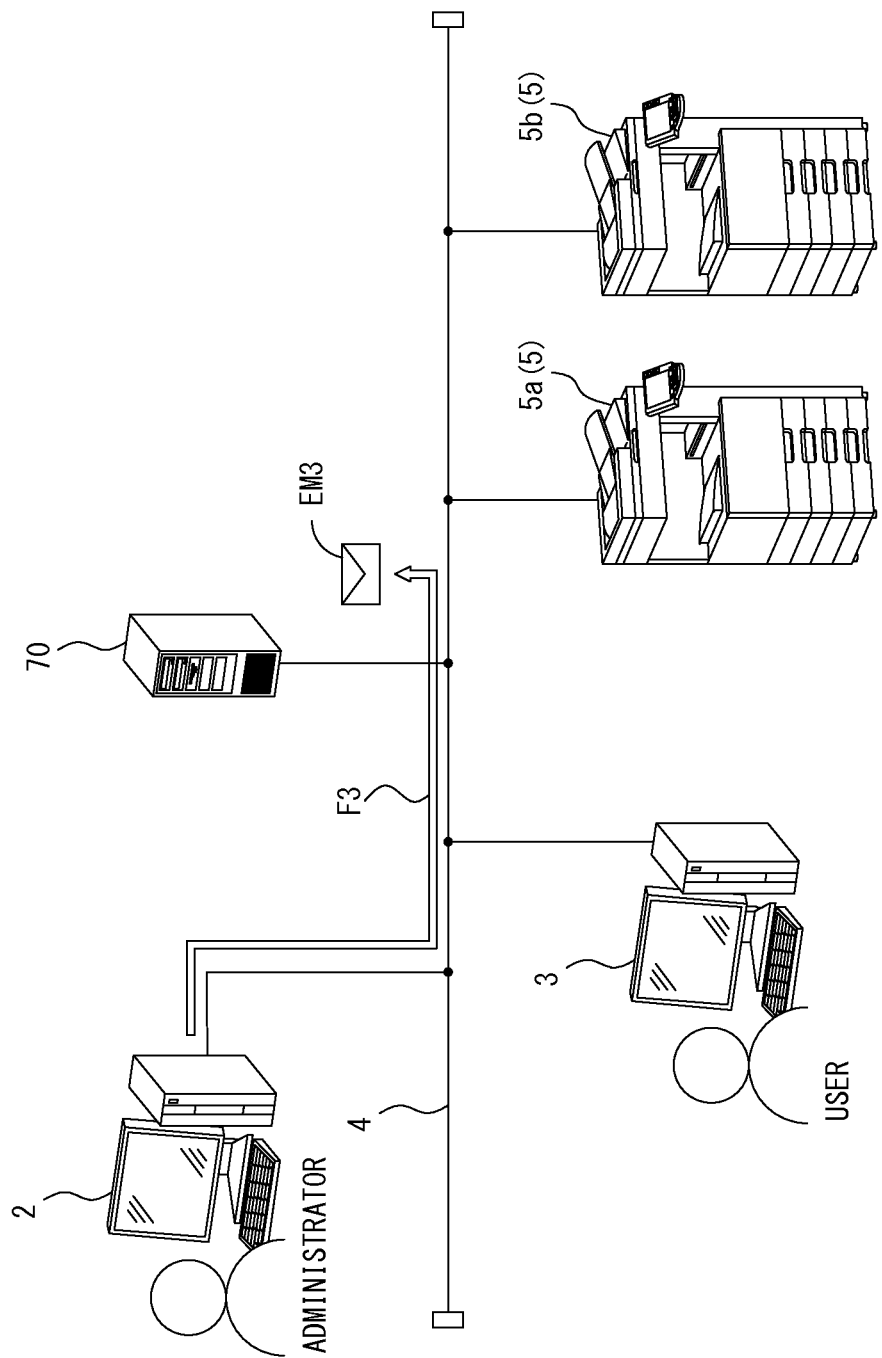
FIG. 14 shows an exemplary configuration when the email relating to the setting of the print device is stored by a print server.

A second preferred embodiment is explained next. According to the first preferred embodiment as described above, the information processing device 3 used by the user and the image forming device 5 are connected to each other over the network 4. The print job generated by the driver 15 of the information processing device 3 is directly sent to the image forming device 5 from the information processing device 3 over the network 4. The administrator uses the information processing device 3 to send the email EM1 notifying the user of the information such as the instruction relating to the print settings at the image forming device 5 to the user, and the email EM2 to the image forming device 5. The driver 15 extracts the unopened email which includes the specific character string in the title from among the email EM1 stored in the information processing device 3 and the email EM2 stored in the image forming device 5, then notifies the user of the extracted email. According to the second preferred embodiment, on the other hand, the information processing device 3 used by the user and the image forming device 5 are connected to each other via a print server 70 as illustrated in FIG. 14. The print job generated at the information processing device 3 is stored in the print server 70, and the print server 70 outputs the print job to the image forming device 5. The administrator uses the information processing device 3 to send an email EM3 notifying the user of the information such as the instruction relating to the print settings at the image forming device 5 to the print server 70.

To be more specific, the administrator sends the email EM3 notifying the user of the information such as the instruction relating to the print settings at the image forming device 5 to the print server 70 by following a route illustrated with an arrow F3, for example. When the user uses the information processing device 3 to generate the print job and send the generated print job to the print server 70, the detecting part 26 of the driver 15 performs the email detecting process as illustrated in FIG. 13. The detecting part 26 makes an inquiry to the print server 70 if there is the email EM3 which includes the specific character string in the title in the email stored in the print server 70. After the driver 15 receives the extracted email EM3 from the print server 70, the notifying part 27 performs the notification process explained in FIG. 12 to notify the user of the email EM3. When the email EM3 is stored in the print server 70, the print job may be cancelled. As a result, the user is allowed to generate the print job and cause the image forming device 5 to produce the printed output appropriately by knowing the setting change at the image forming device 5 notified by the administrator.

Modifications

While the preferred embodiments of the present invention have been described above, the present invention is not intended to be confined to the details shown above.

According to the first and second preferred embodiments as described above, the email EM1, EM2 or EM3 is sent by the administrator to the user, the image forming device 5 or the print server. The email EM1, EM2 or EM3 is not necessarily sent by the administrator. The email as to the change is automatically sent to the user or the print server from the image forming device 5 when, for example, the print setting is changed at the image forming device 5.

In the above-described first and second preferred embodiments, the email which is sent by the administrator, includes the specific character string information 19 in the title and is unopened is extracted. The present invention does not limit to the unopened email. The email to which the flag is assigned by the administrator or the user may be extracted.

In the above-described first and second preferred embodiments, the detecting process to detect individually the email EM1 sent to the information processing device 3, the email EM2 sent to the image forming device 5 or the email EM3 sent to the print server 70 by the administrator. The detecting process of the present invention includes not only the process to detect each email EM1, EM2 and EM3 individually, but also the process to detect the emails EM1 and EM2 at the same time and to detect the emails EM1 and EM3 at the same time.

When the administrator sends the emails EM1, EM2 and EM3 which are the same in content to the user and the image forming device 5 or the print server 70, the emails EM1, EM2 and EM3 which are the same in content are detected, resulting in late email checking operation. Thus, when the emails EM1, EM2 and EM3 which include the specific character string in the title are extracted, the detecting part 26 may determine if the emails EM1, EM2 and EM3 are the same in content. If the emails EM1, EM2 and EM3 are the same in content, the detecting part 26 may store one of them in the memory and notifies the user. The detecting part 26 determine if the emails EM1, EM2 and EM3 are the same in content by determining if the transmitted date and time and the title are the same, for example. Alternatively, the detecting part 26 determines the emails EM1, EM2 and EM3 are the same in content if the message IDs are the same. To be more specific, if the transmitted date and time and the title are the same, the same emails are sent by the administrator to the multiple addresses. The message ID is a unique ID which allows to identify the specific email. Thus, if the message IDs are the same, the same emails are sent by the administrator to the multiple addresses.

In the above-described first and second preferred embodiments, when the operational procedure such as the authentication process or the billing process at the image forming device 5 is changed by the administrator, the user of the information processing device 3 is notified of the setting change of the device driver. The user is not only notified when the operational procedure is changed but also when the optional function is added to the image forming device 5 by the administrator and version up of the device driver installed on the information processing device 3 of each user is required to use the optional function. The notification method of the present application as described above may be applied for notification of such version up to the user.

What is claimed is:

1. A non-transitory computer readable recording medium on which a device driver is recorded, said device driver being booted on an information processing device connected to an output device and outputting an output job by generating said output job, said device driver causing said information processing device to serve as:

a search condition registering part wherein a search condition to detect a predetermined email is registered in advance, the email being constructed by an address of a destination and a message;

a detecting part configured to detect an email which matches said search condition from among emails which have been received in the past; and a notifying part configured to notify a user when the email that matches said search condition is detected by said detecting part, wherein when the email which matches said search condition is detected, settings of the output device are configured to be changed by the user based on notification in the email prior to outputting the output job.

2. The non-transitory computer readable recording medium according to claim 1, wherein said search condition includes a character string which allows to identify said output device.

3. The non-transitory computer readable recording medium according to claim 1, wherein said notifying part notifies a received date and a title of the email when the email which matches said search condition is detected.

4. The non-transitory computer readable recording medium according to claim 1, wherein said notifying part displays a body of the email when the email which matches said search condition is detected.

5. The non-transitory computer readable recording medium according to claim 1, wherein
said detecting part does not detect a read email of the email which matches said search condition.

6. The non-transitory computer readable recording medium according to claim 1, wherein
said detecting part sends a request to an external application which receives the email to search for the email which matches said search condition from among the emails which said external application has received in the part, and detects the email which matches said search condition based on a search result by said external application.

7. The non-transitory computer readable recording medium according to claim 6, wherein
said notifying part causes said external application to display the email when the email which matches said search condition is detected.

8. The non-transitory computer readable recording medium according to claim 1, wherein,
said detecting part sends a request to said output device to search for the email which matches said search condition from among the emails which said output device has received in the part, and detects the email which matches said search condition based on a search result by said output device.

9. The non-transitory computer readable recording medium according to claim 1, wherein
said detecting part sends a request to a server which connects said output device and said information processing device to search for the email which matches said search condition from among the emails which said server has received in the part, and detects the email which matches said search condition based on a search result by said server.

10. The non-transitory computer readable recording medium according to claim 8, wherein
said search condition includes a character string which allows to identify the user.

11. The non-transitory computer readable recording medium according to claim 1, said device driver causing said information processing device to further serve as:
an outputting part configured to generate the output job and outputting said generated output job to said output device based on a user instruction to issue the output job, wherein
said detecting part starts a process to detect the email which matches said search condition in response to detecting the user instruction to issue said output job, and
said outputting part does not output said output job as the process to detect the email which matches said search condition is being performed by said detecting part.

12. The non-transitory computer readable recording medium according to claim 11, wherein
said outputting part does not output said output job when the email which matches said search condition is detected by the detecting part.

13. The non-transitory computer readable recording medium according to claim 1, wherein
said notifying part is allowed to configure in advance whether or not to notify the user, and when the email which matches said search condition is detected, said notifying part notifies the user if setting to notify the user is configured in advance.

14. The non-transitory computer readable recording medium according to claim 1, wherein
said search condition is a condition to detect an email relating to a setting change of the output device.

15. The non-transitory computer readable recording medium according to claim 1, wherein
said search condition is a predetermined character string.

16. The non-transitory computer readable recording medium according to claim 1, wherein
said message comprises a title and a body.

17. An information processing device connected to an output device, comprising:
a search condition registering part wherein a search condition to detect a predetermined email is registered in advance, the email being constructed by an address of a destination and a message;
a detecting part configured to detect an email which matches said search condition from among entails which have been received in the past; and
a notifying part configured to notify a user when the email that matches said search condition is detected by said detecting part,
wherein when the email which matches said search condition is detected, settings of the output device are configured to be changed by the user based on notification in the email prior to outputting the output job.

18. The information processing device according to claim 17, wherein
said search condition includes a character string which allows to identify said output device.

19. The information processing device according to claim 17, wherein
said notifying part notifies a received date and a title of the email when the email which matches said search condition is detected.

20. The information processing device according to claim 17, wherein
said notifying part displays a body of the email when the email which matches said search condition is detected.

21. The information processing device according to claim 17, wherein
said detecting part does not detect a read email of the email which matches said search condition.

22. The information processing device according to claim 17, wherein
said detecting part sends a request to an application which receives the email to search for the email which matches said search condition from among the entails which said application has received in the part, and detects the email which matches said search condition based on a search result by said application.

23. The information processing device according to claim 22, wherein
said notifying part causes said application to display the email when the email which matches said search condition is detected.

24. The information processing device according to claim 17, wherein
said detecting part sends a request to said output device to search for the email which matches said search condition from among the emails which said output device has received in the part, and detects the email which matches said search condition based on a search result by said output device.

25. The information processing device according to claim 24, wherein said search condition includes a character string which allows to identify the user.

26. The information processing device according to claim 17, wherein said detecting part sends a request to a server which connects said output device and said information processing device to search for the email which matches said search condition from among the emails which said server has received in the part, and detects the email which matches said search condition based on a search result by said server.

27. The information processing, device according to claim 17, further comprising:

an outputting part configured to generate the output job and outputting said generated output job to said output device based on a user instruction to issue the output job, wherein said detecting part starts a process to detect the email which matches said search condition in response to detecting the user instruction to issue said output job, and said outputting part does not output said output job as the process to detect the email which matches said search condition is being performed by said detecting part.

28. The information processing device according to claim 27, wherein said outputting part does not output said output job when the email which matches said search condition is detected by the detecting part.

29. The device driver according to claim 17, wherein said notifying part is allowed to configure in advance whether or not to notify the user, and when the email which matches said search condition is detected, said notifying part notifies the user if setting to notify the user is configured in advance.

30. A notification method applied at an information processing device which is connected to an output device, comprising the steps of:

(a) detecting an email which matches a search condition to detect a predetermined email from among entails which have been received in the past, said search condition being registered in advance in a search condition registering part, the email being constructed by an address of a destination and a message and comprising notification which allows a user to chain settings of the output device; and (b) notifying a user when the email that matches said search condition is detected in said step (a).

* * * * *